(12) United States Patent
Oh et al.

(10) Patent No.: US 9,694,235 B2
(45) Date of Patent: Jul. 4, 2017

(54) METHOD AND SYSTEM FOR VIRTUAL HIKING

(71) Applicant: Samsung Electronics Co., Ltd., Gyeonggi-do (KR)

(72) Inventors: Heungno Oh, Gwangju (KR); Myungjong Kim, Gwangju (KR); Jongchan Kim, Gwangju (KR); Jongpil Kim, Gwangju (KR); Juyeon Kim, Gyeonggi-do (KR); Eunnam Song, Gwangju (KR); Jounggeun Jo, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/324,898

(22) Filed: Jul. 7, 2014

(65) Prior Publication Data

US 2015/0011362 A1 Jan. 8, 2015

(30) Foreign Application Priority Data

Jul. 5, 2013 (KR) .................. 10-2013-0078826

(51) Int. Cl.
*A63B 24/00* (2006.01)
*A63B 22/06* (2006.01)
(Continued)

(52) U.S. Cl.
CPC ...... *A63B 22/0605* (2013.01); *A63B 24/0087* (2013.01); *A63B 71/0622* (2013.01); *A63F 13/245* (2014.09); *A63F 13/816* (2014.09); *A63F 13/90* (2014.09); *G06F 3/011* (2013.01); *A63B 22/0023* (2013.01);
(Continued)

(58) Field of Classification Search
CPC ............ A63B 22/0605; A63B 22/0023; A63B 71/0622; A63B 24/00; A63B 24/0062; A63B 24/0087; A63B 2024/009; A63B 2024/0096; A63B 2071/0081; A63B 2071/0638; A63B 2071/0666; A63B 2220/78; A63B 2220/805; A63B 2225/20; A63B 2225/50
See application file for complete search history.

(56) References Cited

U.S. PATENT DOCUMENTS

| 5,551,920 | A | * | 9/1996 | Ogden ............... G09B 9/02 434/55 |
| 5,752,834 | A | * | 5/1998 | Ling ................. G09B 9/12 434/55 |

(Continued)

FOREIGN PATENT DOCUMENTS

| KR | 1019990068700 | 9/1999 |
| KR | 100310710 | 9/2001 |
| KR | 1020120078044 | 7/2012 |

*Primary Examiner* — Glenn Richman
(74) *Attorney, Agent, or Firm* — The Farrell Law Firm, P.C.

(57) ABSTRACT

A virtual biking system and a virtual hiking method by which a user can bike indoors while simulating actually being outdoors are provided. The virtual hiking system includes a Personal Computer (PC) configured to display a simulation screen, a motion platform configured to move corresponding to a state of a road of the simulation screen displayed on the PC, and a bicycle fixed onto the motion platform such that the simulation screen is changed corresponding to a movement and a speed of a handle.

9 Claims, 46 Drawing Sheets

(51) Int. Cl.
*A63B 71/06* (2006.01)
*G06F 3/01* (2006.01)
*A63F 13/90* (2014.01)
*A63F 13/245* (2014.01)
*A63F 13/816* (2014.01)
*A63B 22/00* (2006.01)
*A63B 71/00* (2006.01)

(52) U.S. Cl.
CPC . *A63B 2024/009* (2013.01); *A63B 2024/0096* (2013.01); *A63B 2071/0081* (2013.01); *A63B 2071/0638* (2013.01); *A63B 2071/0666* (2013.01); *A63B 2220/78* (2013.01); *A63B 2220/805* (2013.01); *A63B 2225/20* (2013.01); *A63B 2225/50* (2013.01); *A63B 2230/06* (2013.01); *G06F 2203/012* (2013.01)

(56) References Cited

U.S. PATENT DOCUMENTS

| | | | | |
|---|---|---|---|---|
| 5,782,639 A * | 7/1998 | Beal | A63B 71/0622 | 434/29 |
| 6,047,610 A * | 4/2000 | Stocco | B25J 17/0266 | 74/479.01 |
| 6,468,082 B1 * | 10/2002 | Denne | F15B 11/036 | 434/55 |
| 7,226,395 B2 * | 6/2007 | Wu | A63B 69/16 | 280/293 |
| 7,530,929 B2 * | 5/2009 | Feldman | A63B 22/0007 | 434/55 |
| 8,348,047 B2 * | 1/2013 | Lynch | B65G 27/00 | 198/750.1 |
| 9,162,106 B1 * | 10/2015 | Scheiman | A63B 23/08 | |
| 2005/0069839 A1 * | 3/2005 | Denne | A63F 13/08 | 434/29 |
| 2007/0221480 A1 * | 9/2007 | Lynch | B65G 27/00 | 198/752.1 |
| 2009/0163283 A1 * | 6/2009 | Childress | A63F 13/08 | 463/47 |
| 2011/0164044 A1 * | 7/2011 | Huang | A63B 21/0004 | 345/473 |
| 2012/0267504 A1 * | 10/2012 | Atluri | G09B 9/12 | 248/419 |
| 2014/0135996 A1 * | 5/2014 | Yu | G05B 15/02 | 700/275 |
| 2014/0243156 A1 * | 8/2014 | Cohen | A63B 71/023 | 482/51 |
| 2014/0274564 A1 * | 9/2014 | Greenbaum | A63B 24/0087 | 482/5 |

* cited by examiner

FIG. 6
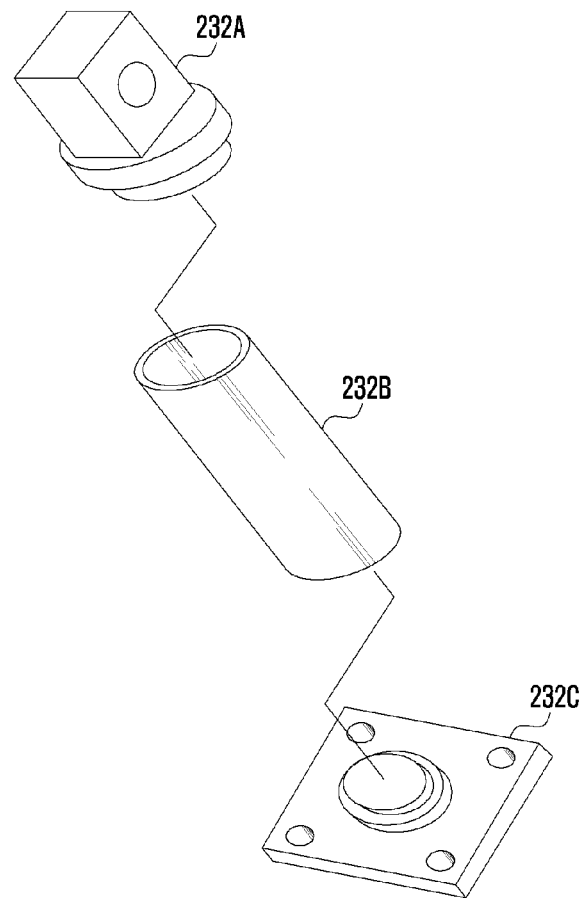
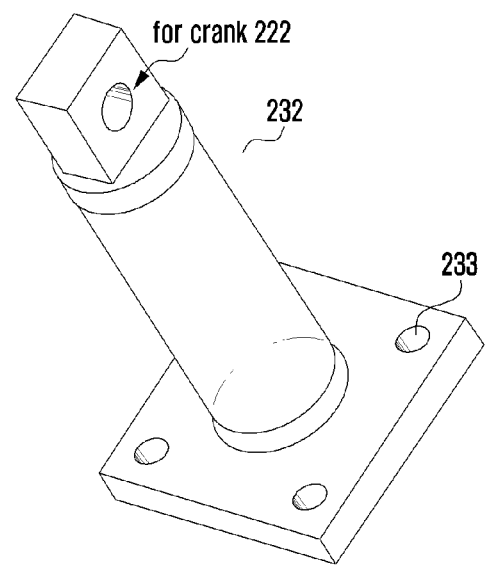

| INCLINATION | ANGLE | INCLINATION | ANGLE | INCLINATION | ANGLE | INCLINATION | ANGLE |
|---|---|---|---|---|---|---|---|
| 4% | 2.3 | 14% | 8.0 | 25% | 14.0 | 35% | 19.3 |
| 5% | 2.9 | 15% | 8.5 | 26% | 14.6 | 36% | 19.8 |
| 6% | 3.4 | 16% | 9.1 | 27% | 15.1 | 37% | 20.3 |
| 7% | 4.0 | 17% | 9.6 | 28% | 15.6 | 38% | 20.8 |
| 8% | 4.6 | 18% | 10.2 | 29% | 16.2 | 39% | 21.3 |
| 9% | 5.1 | 19% | 10.8 | 30% | 16.7 | 40% | 21.8 |
| 10% | 5.7 | 20% | 11.3 | 31% | 17.2 | 41% | 22.3 |
| 11% | 6.3 | 21% | 11.9 | 32% | 17.7 | 42% | 22.8 |
| 12% | 6.8 | 22% | 12.4 | 33% | 18.3 | 43% | 23.3 |
| 13% | 7.4 | 23% | 13.0 | 34% | 18.3 | 44% | 23.7 |
| 14% | 8.0 | 24% | 13.5 | 35% | 18.8 | 45% | 24.2 |

FIG. 23

AC Motor Formula

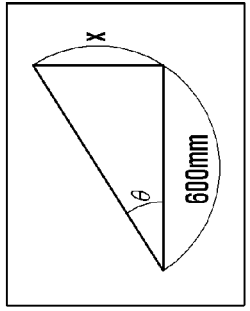

Pitch, ROll     Pitch, ROll
Pitch Height = tan (Pitch) X 600mm
Roll Heigit = tan (Roll) x 600mm
Motor 1 Height = 175 mm + (Roll Height/ 2)
Motor 2 Height = 175 mm + (Roll Height/ 2) + (Pitch Height/ 2)
Motor 3 Height = 175 mm + (Roll Height/ 2) + (Pitch Height/ 2)

Exception handling

Motor Angle = $\cos^{-1}(\,((\text{Motor Height})^2 + (81mm)^2$
$- (162mm)^2\,) / (162mm \times \text{Motor Height})\,)$

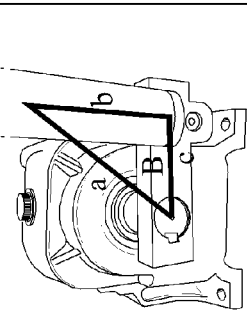

$$\cos B = \frac{a^2 + c^2 - b^2}{2ac}$$

b = 175mm(shaft), c = 81mm(crank)
a = Motor Height

- Motive
- Goal
- Architecture
- Project Detail
- Problem
- Dev. Env
- Role Division
- Schedule
- Simulation
- Q/A

FIG. 46

| 4605 | | 4610 | 4615 | 4620 | 4625 | 4630 | 4635 | 4640 | 4645 |
|---|---|---|---|---|---|---|---|---|---|
| 0xFF | 0xFF | Handle H | Handle L | Heart beet | Speed | Break | Yaw | Pitch | Check Sum |
| 0xAA | 0xAA | \multicolumn{2}{c}{Pitch} | | | Roll | | \multicolumn{2}{c}{Check Sum} |

METHOD AND SYSTEM FOR VIRTUAL HIKING

PRIORITY

This application claims priority under 35 U.S.C. §119(a) to Korean Patent Application No. 10-2013-0078826, filed on Jul. 5, 2013, the contents of which are incorporated herein by reference.

BACKGROUND OF THE INVENTION

1. Field of the Invention

The present invention relates generally to a virtual hiking apparatus and method, and more particularly, to a virtual hiking system and method by which a user can hike indoors while simulating the effect of actually hiking outdoors.

2. Description of the Related Art

In modern society, many people use fitness centers to maintain their heath and body shape, and use bicycles on public roads. However, outdoor hiking exposes users to many dangerous potentials such as accidents.

Exercise machines such as stationary bicycles and running machines (treadmills) are provided indoors to prevent accidents while users exercise, and also help users to regularly exercise. The stationary bicycles are advantageous to physically weak or elderly people, as they lessen impact on the user's knees as compared to running machines. The stationary bicycles are also suitable for purposes of aerobic exercise and do not make users feel fatigued even after the user exercises for a long time, which promotes long periods of exercise.

However, since exercising can be rather uninteresting, it can be difficult to continue to exercise for a long period of time.

Specifically, while using stationary bicycles for a long time, users may become bored due to monotonous exercising motions and confined workout spaces, which can hinder exercise.

In order to solve these problems, it is necessary to increase the utility of a stationary bicycle so that the user can more easily exercise for a long time. Such apparatuses for this purpose have been developed. For example, map biking was developed for advertising or promotion to use bicycles as a life transportation means. Map biking is configured such that various units such as a microcontrollers are connected to a bicycle, to enable the bicycle to virtually travel around the downtown areas of Rio de Janeiro, Amsterdam and Tokyo, for example, by using Google StreetView™. Map biking is a game in which if a user pushes the pedals of a stationary bicycle, Google StreetView™ moves a target distance and the user accumulates items in the middle. However, map biking simply provides changing screens in StreetView, but does not provide other particular contents.

Ships is a Three-Dimentional (3D) game produced with Google Earth™ by an Information Technology (IT) company in New Zealand, in which a virtual ship navigates while performing a simulation. The game is produced such that when a user adjusts the direction of the ship by using the direction keys of a keyboard, a handle moves in response to movement of the ship. The user may select one of various ships. However, Ships was produced for promotion of the company, there was low interest in other aspects of the game, and Ships does not include an exercise function.

Tokyo Jogging pairs a Wiimote (a compound word of Wii™ and remote controller) produced by Wii™ and a Java® server through a Bluetooth® communication, and dynamically transfers Wiimote information to a server. Google Map API (Application Program Interface) was used to process a received response value by using JavaScript Object Notation with Padding (JSONP). According to the contents of Tokyo Jogging, Wiimote is put into a pocket, and accordingly a screen of Google StreetView™ proceeds forward when the user is in the act of running. A forward motion is manipulated through the Wiimote by using Google StreetView™. However, the game does not move the screen in real time, but instead generates buffering, which deteriorates the sensation.

There is a motorcycle racing game from SEGA®. In the game, a motorcycle device is swayed to a side where the weight of a user leans so that the user may feel the sensation of actually riding a motorcycle, and accordingly, a method of adjusting the direction of the motorcycle on the game is employed. The game is popular since people can experience riding a motorcycle. However, the gage realizes only leftward and rightward directions, and does realize an inclination or an impact. The speed of the motorcycle is adjusted by the throttle of a handle, and does not relate to exercise.

A three-axis motion platform system of SUN Aerosys Co. Ltd is a product mainly used in airplane or electric car simulators. The motion platform system makes a passenger feel as if they are actually riding in an airplane or an electric car and controls a motion such that a user may directly operate the system. In this aspect, the system is similar to a virtual hiking machine, but has no exercise function.

SUMMARY OF THE INVENTION

The present invention has been made to address at least the above-mentioned problems and/or disadvantages and to provide at least the advantages described below. Accordingly, an aspect of the present invention is to provide a virtual hiking system and method by which a user can enjoy the simulation of actually hiking indoors.

Another aspect of the present invention is to provide a virtual hiking apparatus and method by which a user can view an exercise distance, speed, and pulse while exercising to check a state of the user.

Another aspect of the present invention is to provide a virtual hiking system and method by which a user can feel a virtual reality according to an operation of the user such as virtual travel or virtual flight.

In accordance with an aspect of the present invention, there is provided a virtual hiking system including a Personal Computer (PC) configured to display a simulation screen, a motion platform configured to move corresponding to a state of a road of the simulation screen displayed on the PC, and a bicycle fixed onto the motion platform such that the simulation screen is changed corresponding to a movement and a speed of a handle.

In accordance with another aspect, there is provided a virtual hiking method for receiving virtual hiking simulation information through a server and providing virtual hiking, including displaying a start page screen from which a hiking mode page and an information page are selected, changing if a user selects the information page, subscriber information through the displayed information page, and displaying, if the user selects the hiking mode page, a virtual simulation according to a hiking mode.

BRIEF DESCRIPTION OF THE DRAWINGS

The above and other aspects, features and advantages of the present invention will be more apparent from the following detailed description in conjunction with the accompanying drawings, in which:

FIG. 6 illustrates a state in which a plate connected to a joint and a part connected to a bearing are separately manufactured and coupled to opposite sides of a cylindrical shaft to reduce the weights of shafts 232, 234, and 236 according to an embodiment of the present invention;

FIG. 23 is a view illustrating formulas for controlling the AC motors 212, 214, and 216 according to an embodiment of the present invention;

FIG. 46 is a packet table illustrating a packet configuration for communication between systems according to an embodiment of the present invention.

DETAILED DESCRIPTION OF EMBODIMENTS OF THE INVENTION

Figure 1:
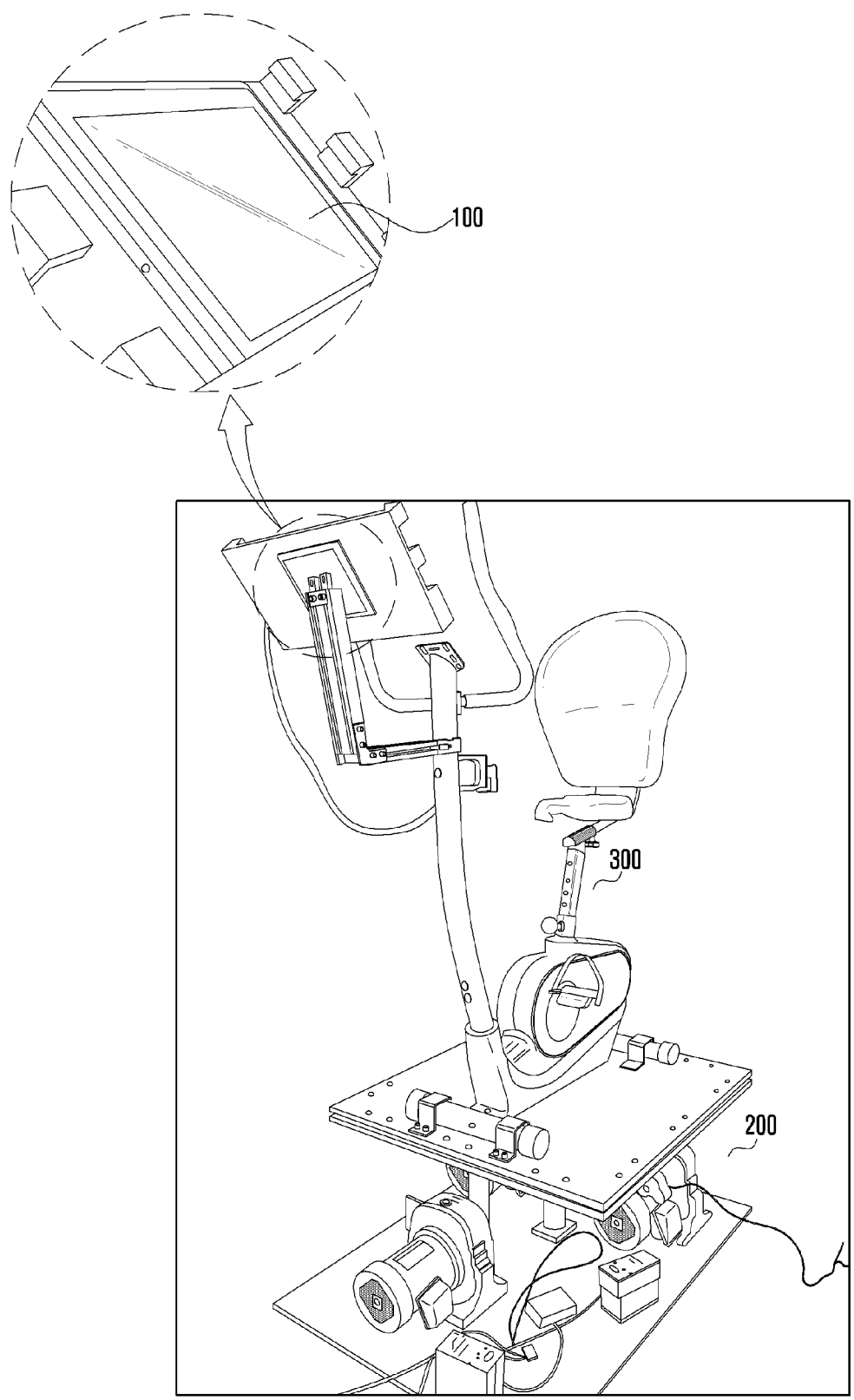
FIG. 1 is a perspective view illustrating a virtual hiking system according to an embodiment of the present invention.

Embodiments of the present invention will be described in detail with reference to the accompanying drawings. It should be noted that the same elements will be designated by the same reference numerals although they are shown in different drawings. Detailed descriptions related to well-known functions or configurations capable of making subject matters of the present invention unnecessarily obscure will be omitted.

Embodiments of the present invention disclosed in the specification and the drawings are merely specific examples provided to easily describe the technical contents of the present invention and help understanding of the present invention, and are not intended to limit the scope of the present invention. It will be appreciated by those skilled in the art to which the present invention pertains that various modifications based on the technical spirit of the present invention can be performed in addition to the embodiments disclosed herein.

The following definitions are provided for a better understanding of the present invention, as desribed herein.

Potentiometer: Variable resistor for changing a linear displacement and a rotational displacement into an electrical resistance. Types of the potentiometer include a contact type and a non-contact type. The contact type has a structure in which a brush moves on a resistance body. A linear type potentiometer may have a stroke of about 1,000 mm and a rotational type potentiometer may be rotated one or more times.

Servo motor: An apparatus for driving a load in response to a control signal as a manipulation part of a servo mechanism.

Embedded system: A solution or system additionally mounted to perform a given operation in a specific product or a solution.

Shock absorber: An apparatus for stabilizing a vehicle body by restraining elasticity of a spring.

ATMega128: A 8-bit controlling microprocessor that was established in 1984 and initially released in 1997 on ATMEL of the U.S.

AC motor: A motor operated by an Alternating Current power source. Main types of the AC motor include a 3-phase induction motor and a single-phase induction motor.

Inverter: An AC motor has the following relationship between a rotating speed, the number of poles, and a frequency of the motor. (N: rotating speed (Rotations Per Minute (RPM)), f: frequency (Hz), P: number of poles of the motor, s: sliding of the motor). An inverter changes the rotating speed of the motor by changing the frequency, and is applicable for example in a room cooler.

Motion platform: A product used in a platform of an airplane or electric car simulator.

Pitch, roll, Yaw: Pitch corresponds to rotation with respect to the y-axis (vertical inclination), roll corresponds to rotation with respect to the x-axis (leftward and rightward rotation inclination), and yaw corresponds to rotation with respect to the z-axis (leftward and rightward inclination).

Encoder: A sensor for measuring rotation angle.

Pulse width modulation (hereinafter, PWM): One type of pulse modulation. A method of changing the width of a pulse to modulate the pulse according to an intensity of a modulation signal.

PID control: A control method in which P (Proportion), I (Integral), and D (Differential) are combined. A PID control has been used for process control for a long time, and is commercially circulated as a general controller. Three parameters of a proportion gain, an integral time, and a differential time should be determined in the field when the PID control is mounted.

Google Maps™: One of various services provided by Google® by which satellite pictures from all over the World can be seen. Like other services provided by Google®, API is provided for customizing and utilization by developers.

Google Earth™: One of various services provided by Google®. The World can be seen through a 3D screen unlike Google Maps™. Google Earth™ also provides API. Google StreetView™: A service provided by Google®. Google StreetView™ has a function of illustrating actual pictures of streets.

3D (3 Dimensional): A technique of three-dimensionally expressing an object to make a user perceive an object as solid and vivid.

Bluetooth®: A short-range wireless communication technology.

JSONP: JavaScript Object Notation with Padding. Lightweight data exchange format.

Database (hereinafter, DB): A set of data integrated and managed for the purpose of being shared by a plurality of persons.

MCU (Micro Controller Unit): A dedicated processor for controlling a specific system.

Web Application Server (hereinafter, WAS) software: WAS software refers to Internet/Intranet environment software that was developed in various languages mainly to refer to a database or process a general business logic after a web came to the World.

MySQL (My Sequel): One of several relational database management systems based on SQL. MySQL released on January, 1998 became one element of a database server and a development tool product group of MySQL AB that is the foundational business of MySQL.

JavaScript: An interpreter type programming or script language made by Netscape®.

AJAX (Asynchronous JavaScript and XML): One type of WEB2.0 based technologies. AJAX does not refer to a specific technology but is a term that refers to a bundle of technologies used together. It is used to produce a conversational web application. The AJAX application uses a web browser that supports technologies used as a platform for execution, and the browsers supporting the AJAX application include Mozilla Firefox®, Internet Explorer®, Opera, and Safari.

Buckling: A phenomenon of generating bending of a column even with a load equal to or lower than a resiliency limit of a material when an elongated member (long column) receives a compression load. The member is deformed and consequently destructed. Buckling is apt to occur when an eccentric load is applied to a long column or a rod.

MFC (Microsoft Foundation Class): A class library for development of a Windows application program of Microsoft®. MFC is included in Visual C++ and is used in Win32 programming. As the Windows function becomes complex, it is more convenient to use the class library rather than to directly use API. The MFC introduces a recent function of Windows® to substantially become the standard of a class library for Windows® programming.

HMD (Head Mounted Display): An HMD is an image display device by which a large-sized image can be enjoyed while a user wears the HMD in the manner of glasses. It is a next generation portable image display device by which an image can be enjoyed with a large-sized screen or which is applicable to a medical device used for surgery or diagnosis.

Mybud®: An HMD produced by Accupix Inc. Mybud® is a display that is produced in the form of glasses and by which a large-sized surface can be viewed through glasses.

FIG. 1 is a perspective view illustrating a virtual hiking system according to an embodiment of the present invention. Referring to FIG. 1, the virtual hiking system includes a PC 100, a motion platform 200, and a bicycle 300.

The motion platform 200 supports the bicycle 300 that is situated on the motion platform 200 while contacting a support surface thereof. Thus, the motion platform 200 is firmly designed such that a load (150 kg or heavier) of a passenger may be endured by the motion platform 200.

Figure 2:
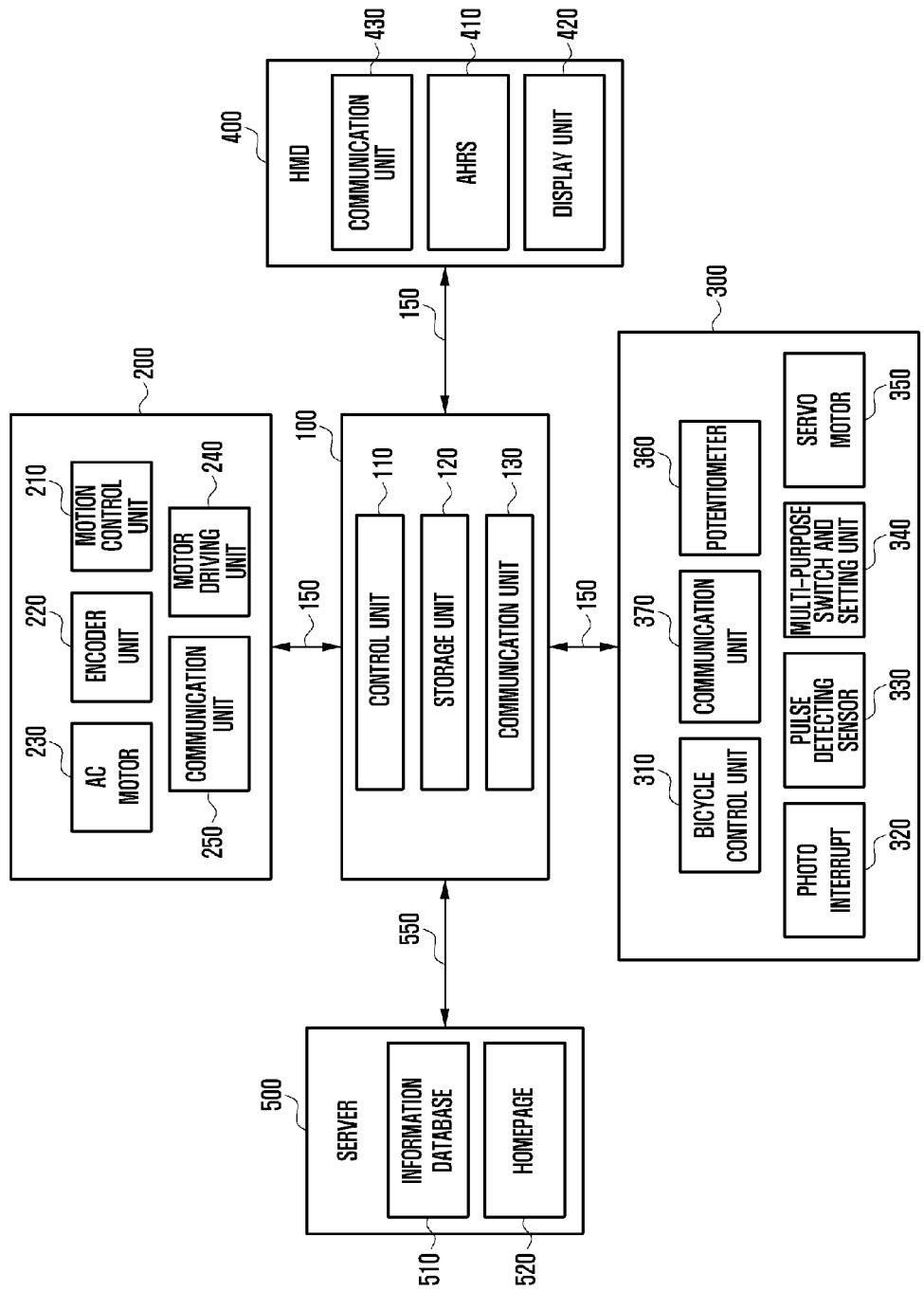
FIG. 2 is a system block diagram schematically illustrating the virtual hiking system according to an embodiment of the present invention.
Figure 5:
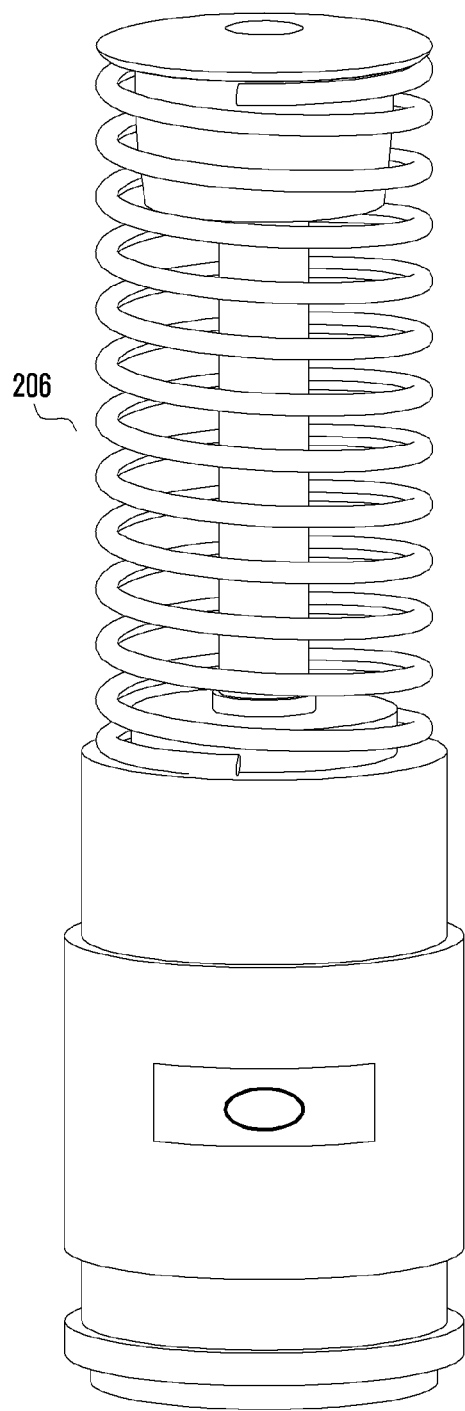
FIG. 5 is a view illustrating a shock absorber 206 according to an embodiment of the present invention.
Figure 7:
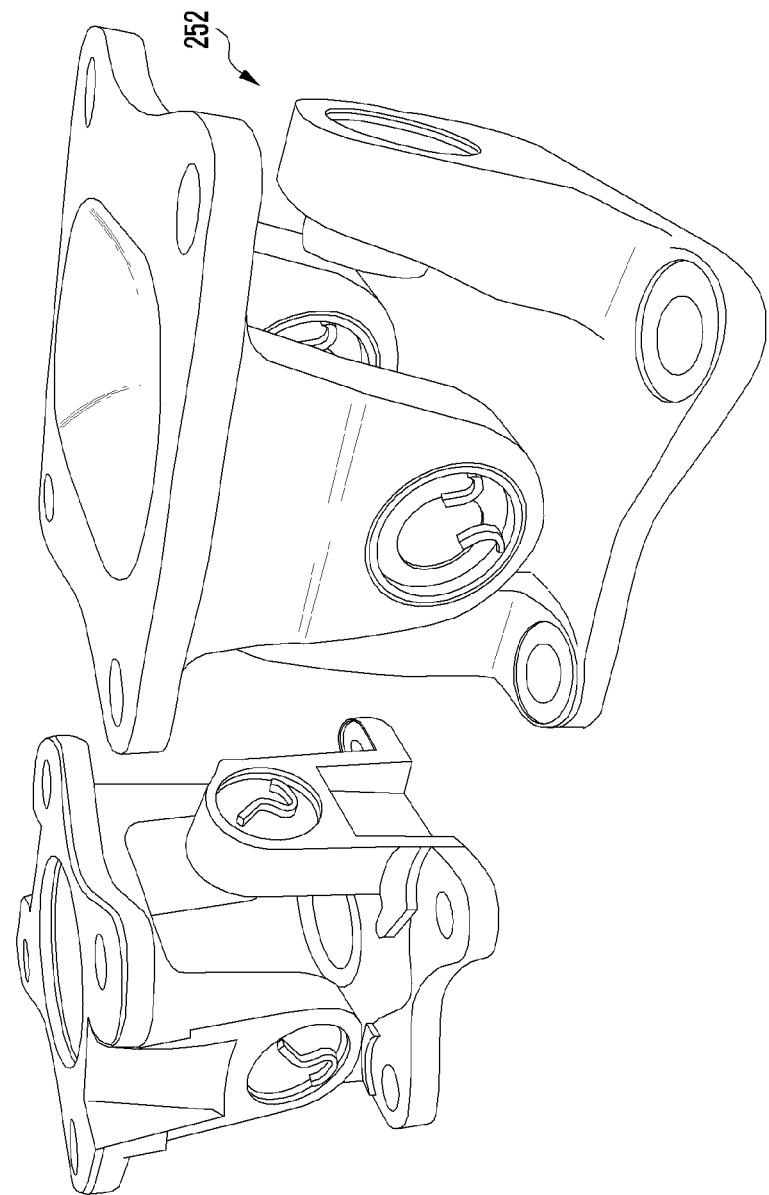
FIG. 7 illustrates a universal joint according to an embodiment of the present invention.

Referring to FIG. 2, the motion platform 200 includes a motion control unit 210, an encoder unit 220, an AC motor unit 230, an AC motor driving unit 240, and a communication unit 250. The motion platform 200 also includes an upper plate support 202 viewed from the outside, as illustrated in FIG. 9, a lower plate support 204, also illustrated in FIG. 9, a shock absorber 206 provided at the center of the interior thereof, as illustrated in FIG. 5, and a universal joint 252 provided in the interior thereof, as illustrated in FIG. 7.

Figure 8:
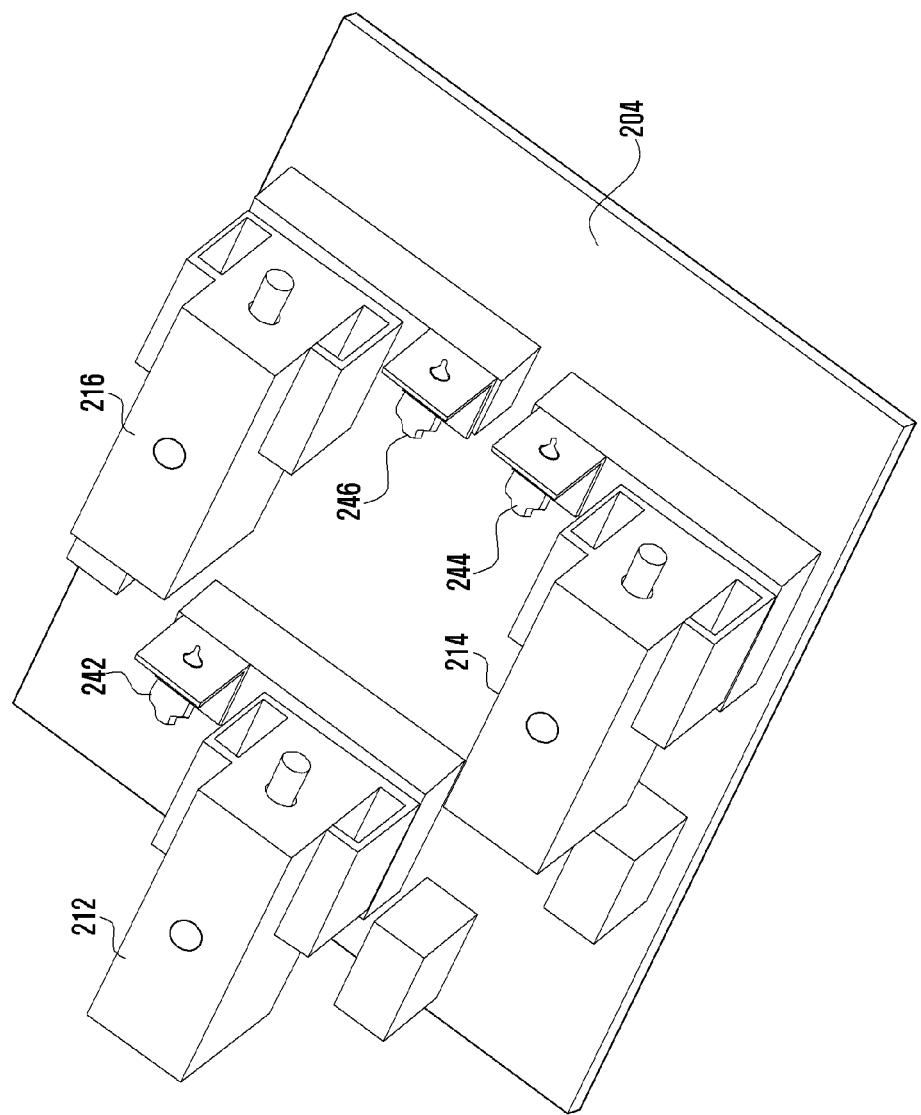
FIG. 8 illustrates three AC motors 212, 214, and 216 fixed to the lower plate support 204 according to an embodiment of the present invention.

Referring to FIG. 8, three AC motors 212, 214, and 216 are fixed to the lower plate support 204. Encoders 242, 244, and 246 for detecting operations or rotation degrees of the AC motors 212, 214, and 216 are provided beside the AC motors 212, 214, and 216, respectively.

Figure 14:
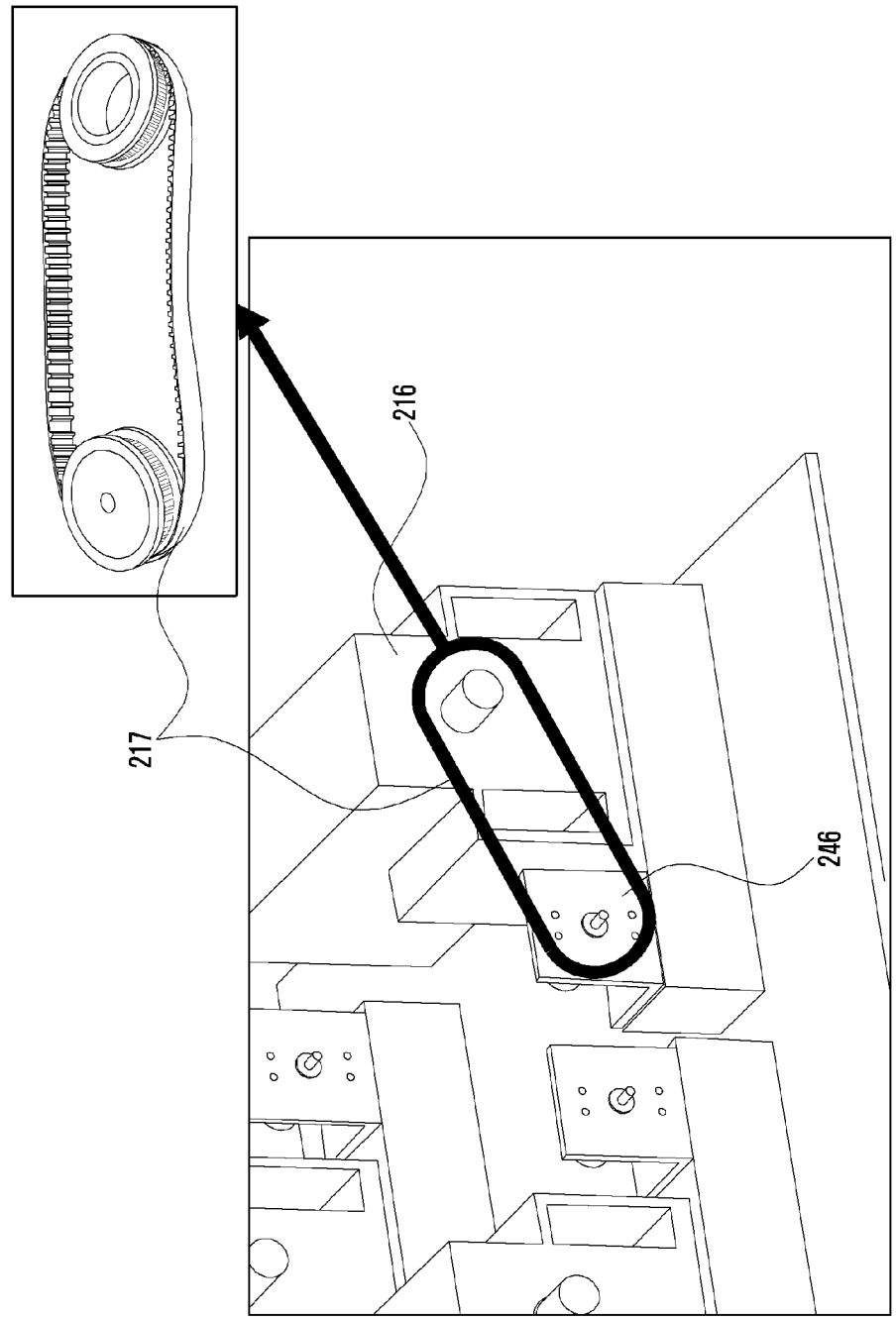
FIG. 14 illustrates a state in which an encoder 246 and the AC motor 216 are connected to each other by a bracket 217 according an embodiment of to the present invention.

Referring to FIG. 14, the encoder 246 and the AC motor 216 are connected by a bracket 217. If the rotation degree of the AC motor 216 is transferred to the encoder 246 through the bracket 217, the encoder 246 may detect the rotation degree of the AC motor 216.

Figure 9:
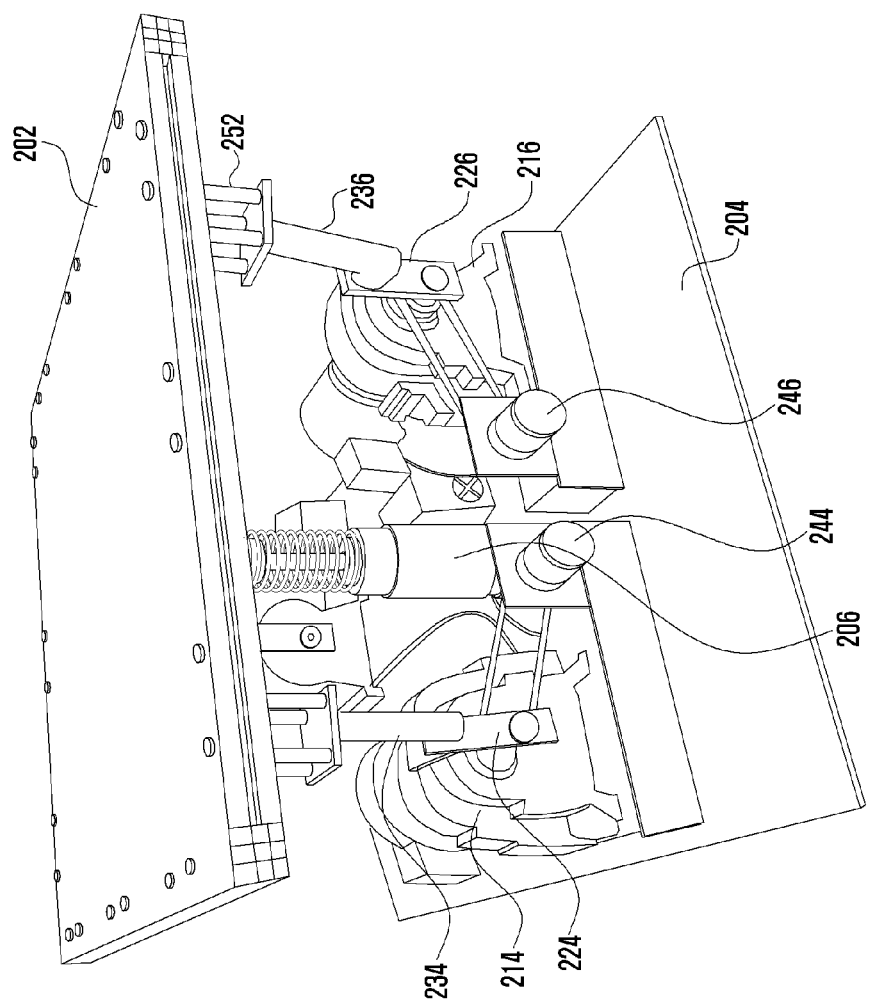
FIG. 9 illustrates the AC motors 212, 214, and 216, cranks 222, 224, and 226, and the shafts 232, 234, and 236 mounted between the upper plate support 202 and the lower plate support 204 according to an embodiment of the present invention.

FIG. 9 illustrates the AC motors 212, 214, and 216, cranks 222, 224, and 226, and shafts 232, 234, and 236 mounted between the upper plate support 202 and the lower plate support 204 according to an embodiment of the present invention. Referring to FIG. 9, the AC motor unit 230 includes a plurality of AC motors 212, 214, and 216, and includes a plurality of cranks 222, 224, and 226 and a plurality of shafts 232, 234, and 236 for supporting the upper plate support 202 and the lower plate support 204.

The AC motors 212, 214, and 216 are fixed to shafts of the cranks 222, 224, and 226 and opposite shafts of the cranks 222, 224, and 226 are fixed to sides of the shafts 232, 234, and 236 through bearings. The shafts of the motors and the shafts 232, 234, and 236 are smoothly moved though the bearings. Opposite sides of the shafts 232, 234, and 236 are fixed to the upper plate support 202. For example, sides of the shafts 232, 234, and 236 are pivotally fixed to the cranks via the bearings and opposite sides of the shafts 232, 234, and 236 are fixed to the upper plate support 202 through screw-coupling. In an embodiment of the present invention, a fixing plate (not shown) is provided at the opposite sides of the shafts 232, 234, and 236 to maintain a firm structure, and several screw holes (not shown) of the upper plate support 202 corresponding to several screw holes (not shown) of the fixing plate are screw-coupled to each other to be fixed.

Power generated by the AC motors 212, 214, and 216 is transferred to the upper plate support 202 through the cranks 222, 224, and 226 and the shafts 232, 234, and 236.

The cranks 222, 224, and 226 and the shafts 232, 234, and 236 transfer power from the AC motors 212, 214, and 216 to the upper plate support 202 such that the upper plate support 202 is operated in pitch, roll, and yaw directions. Bearings are provided at connection parts of the cranks 222, 224, and 226 and the shafts 232, 234, and 236 to substantially improve durability and flexibly move the upper plate support 202.

The encoders 242, 244, and 246 are connected to the AC motors 212, 214, and 216, respectively to detect an operation or a rotation degree of the AC motor unit 230.

The motion control unit 210 controls the AC motors 212, 214, and 216 and the encoders 242, 244, and 246. For example, the motion control unit 210 may detect current motions of the AC motors 212, 214, and 216 according to information from the encoders 242, 244, and 246 connected to the AC motors 212, 214, and 216, for detecting operations of the AC motors 212, 214, and 216 and control the operations of the AC motors 212, 214, and 216.

Referring to FIG. 8, the motion platform 200 includes a lower plate support 204 that is stably supported by a flat surface such as a ground surface and an upper support 202 that receives forces of the AC motors 212, 214, and 216 to be operated in pitch, roll, and yaw directions.

A plurality of AC motors 212, 214, and 216 are fixed to the lower plate support 204. As illustrated in FIG. 9, the upper plate support 202 is supported by the cranks 222, 224, and 226 connected to the AC motors 212, 214, and 216 and the shafts 232, 234, and 236 connected to the cranks 222, 224, and 226, and is also supported by a gravity-compensating shock absorber 206.

Referring to FIG. 5, the shock absorber 206 is shown in more detail. After the shock absorber 206 is installed, as illustrated in FIG. 9, one side of the shock absorber 206 is fixed to the center of the lower plate support 204 and an opposite side thereof is fixed to the center of the upper plate support 202 such that the upper plate support 202 is prevented from being inclined to one side. A spring provided outside the shock absorber 206 absorbs an impact applied from the bicycle 300, which will be described below.

The shock absorber 206 is provided at the center of the upper plate support 202 and the lower plate support 204 such that only vertical positions of the three shafts 232, 234, and 236 are always controlled such that the shafts 232, 234, and 236 are not inclined to one side. The shock absorber 206 is used for compensation of gravity and increases stability of the AC motors 212, 214, and 216. The shock absorber 206 is necessary to prevent the shafts 232, 234, and 236 from being inclined to one side regardless of the torques of the motors at ends of the bearings when the three AC motors 212, 214, and 216 constitute a three-axis link type system. A stroke distance of the shock absorber 206 should be at least 162 mm which is a variable range of the crank shaft.

Referring to FIG. 7 and FIG. 9, a universal joint is shown, and one to four universal joints 252 do not provide power but serve as articulations. The universal joints 252 are connected to the lower plate support 204 and the upper plate support 202 to allow the upper plate support 252 to flexibly move in the pitch, roll, and yaw directions while supporting the upper plate support 202.

In constituting the universal joints 252, the AC motors 212, 214, and 216, the cranks 222, 224, and 226, the shafts 232, 234, and 236, and the shock absorber 206, it is necessary to design thicknesses of the cranks 222, 224, and 226 and the shafts 232, 234, and 236, horsepower of the AC motors 212, 214, and 216, and durability of the universal joints 252 and the shock absorber 206 according to an operation range of the upper plate support 202. In designing the universal joints 252, the AC motors 212, 214, and 216, the cranks 222, 224, and 226, the shafts 232, 234, and 236, and the shock absorber 206, the upper plate support 202 is designed to be operated with an angle between 10-30 degrees. Preferably, the universal joints 252, the AC motors 212, 214, and 216, the cranks 222, 224, and 226, the shafts 232, 234, and 236, and the shock absorber 206 are designed such that an operation range of the upper plate support 202 is not above 15 degrees, for safety purposes.

If the upper plate support 202 forms an inclination angle corresponding to a topology of Google Earth™ that provides 3D topologies, a support force of only the shafts 232, 234, and 236 connected to the upper plate support 202 may be insufficient. Thus, the universal joint 252 may be connected between the lower plate support 204 and the upper plate support 202 to support loads of the bicycle 300 and a passenger added on the upper plate support 202. The universal joints 252 allow the upper plate support 202 to move in pitch, roll, and yaw directions.

Ends of the universal joints 252 are connected to the upper plate support 202 and the lower plate support 204 to support the upper plate support 202. When the upper plate support 202 moves corresponding to a curve of the topology of Google Earth™, the universal joints 252 allow the upper support 202 to flexibly move under the control of the motion control unit 210. Thus, the universal joints 252 are configured to change an angle of the upper plate via the bearings and adjust the height of the upper plate. When one universal joint 252 is installed, the lower plate support 204 corresponding to the upper plate 202 may be connected to the universal joint 252 such that the universal joint 252 is installed at a substantially central portion thereof.

However, since the shock absorber 206 is disposed in the center or weight center of the upper plate support 202 and the lower support plate 204, the universal joint 252 may be disposed in the center of the upper plate support 202 and the lower plate support 204 that is adjacent to the shock absorber 206. When a plurality of universal joints 252 are installed, they may be disposed at locations where the weight of the upper plate support 202 is distributed. For example, when four universal joints 252 are disposed, they may be connected to four corners of the upper plate support 202 and the lower plate support 204. Preferably, four universal joints 252 are installed at the corners of the upper plate support 202 and the lower plate support 204 to improve safety.

Figure 4:
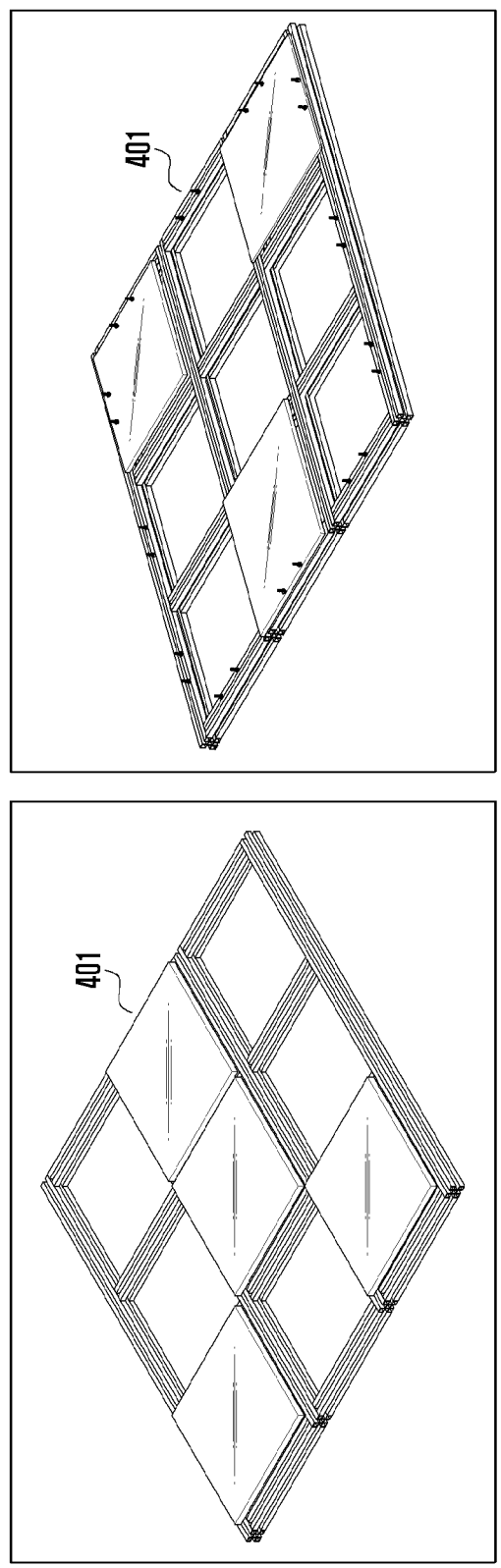
FIG. 4 illustrates a frame structure 401 of an upper plate support 202 or a lower plate support 204 according to an embodiment of the present invention.

FIG. 4 illustrates a frame structure 401 of the upper plate support 202 or the lower plate support 204 according to an embodiment of the present invention. Referring to FIG. 4 and FIG. 9, an upper surface of the upper plate support 202 to which the bicycle 300 is fixed requires significant strength for safety. The upper plate support 202 and the lower plate support 204 should stably support a bicycle passenger as well as the bicycle 300 for safety. A strong material includes iron or an alloy. However, iron is so heavy that high torque is required to control a main frame with a motor. Thus, aluminum is preferably used to manufacture a light, strong frame, and in particular, aluminum profile 40×40 is used. The frame has a shape in which a rectangle is uniformly divided into four parts.

The upper plate support 202 and the lower plate support 204 include a frame having a shape in which a rectangle is uniformly divided into four parts and plates covering upper and lower sides of the frame. In particular, the frame of the upper plate support 202 requires a high degree of safety to support the bicycle 300 and the passenger, and accordingly should be designed to endure the weight of at least 150 kg by increasing a safety coefficient in designing a motor torque due to the loads of the bicycle 300 and the passenger or the frame.

For example, the aluminum profile is regarded as exceeding an allowable load if the frame is bent by 1 mm or more. Since an allowable load with reference to bending of 1 mm or less is 200 kg (i.e., 441 lbs) in the 40×40 standard when a support having a width, a length, and a height of 1 m is manufactured and the frame is configured such that a rectangle is uniformly divided into four parts, the allowable load becomes higher than the value.

Rubber for preventing sliding may be attached to a lower surface of the lower plate support 204.

If the upper plate support 202 forms an inclination angle corresponding to a topology of Google Earth™ that provides 3D topologies, the shafts 232, 234, and 236 connecting the AC motors 212, 214, and 216 and the upper plate support 202 may be damaged. Ends of the universal joints 252 are fixed to the upper plate support 202 and the lower plate support 204 to more stably support the upper plate support 202. The universal joints 252 serve as articulations such that the upper plate support 202 moves in pitch, roll, and yaw directions corresponding to the movements of the AC motors 212, 214, and 126. One universal joint 252 may be provided at a location where the centers of the upper plate support 202 and the lower plate support 204 are connected to each other, or four universal joints 252 may be connected to the four corners of the upper plate support 202 and the lower plate support 204 such that the upper plate support 202 moves while supporting the upper plate support 202.

When the frame has a shape in which a rectangle is uniformly divided into four parts, the weight of the frame is approximately 15 kg (i.e., 33 lbs). The weight of the upper plate support 202 finished by attaching the upper plate and the lower plate to the frame is approximately 20 kg (i.e., 44 lbs) (including the iron plates). If it is expected that a maximum weight of the upper plate support 202, the bicycle passenger, and the bicycle 330 is 180 kg (i.e., 397 lbs), a total load on the upper plate support 202 is 200 kg. The total load is multiplied by 1.5 in consideration of safety, a load that should be supported by the upper plate support 202 is 300 kg (i.e., 661 lbs).

Figure 10:
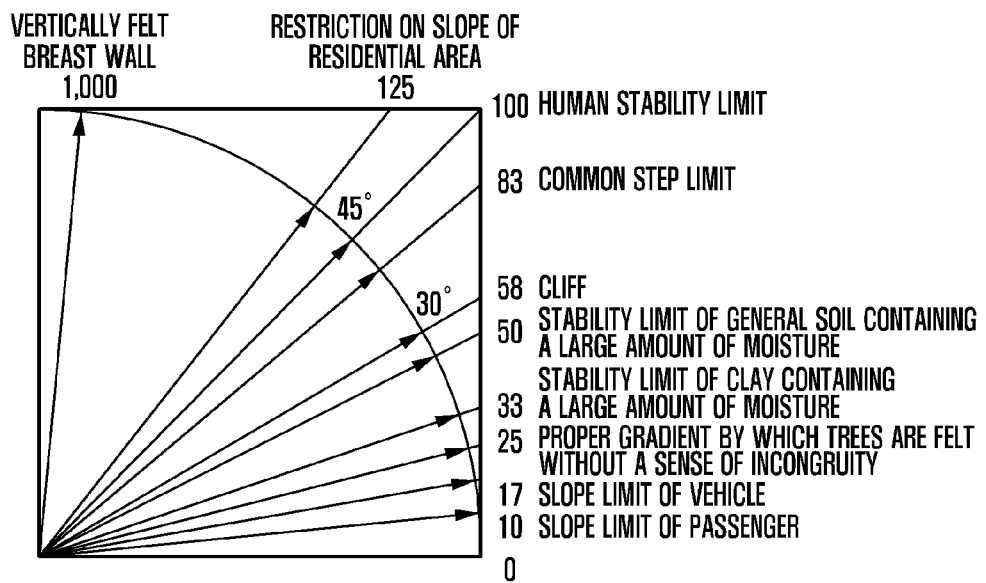
FIG. 10 illustrates a graph depicting an inclination limit and a table representing changes in inclination angles according to inclinations, according to an embodiment of the present invention.

The graph of FIG. 10 depicts an inclination limit, and the Table of FIG. 10 represents changes of inclination angle according to inclinations, according to an embodiment of the present invention. As illustrated in the Table of FIG. 10, since an inclination stability limit of a road for vehicles is 17%, which corresponds to approximately 9.6 degrees, 10 degrees is preferable in consideration of safety. Since entertainment and sensation are decreased if only stability is considered, approximately up to 24 degrees may be possible in consideration of a maximum inclination of 45%. However, a universal joint 252 that endures a load while being bent by up to 15 degrees may be designed to guarantee safety and realize sensation.

In order to stably fix the shafts 232, 234, and 236 connected to the bicycle 300 and the AC motors 212, 214, and 216 including three shafts to a lower surface of the upper plate support 202, the size of the upper plate support 202 may have a rectangular or square shape of approximately 1500 mm×1500 mm or 600 mm×600 mm. If the size of the upper plate support 202 is the larger size, stability increases but sensation is lowered as a motion angle of the upper plate support 202 decreases. If the size of the upper plate support 202 is the smaller size, a motion angle of the upper plate support 202 increases, which increases sensations or interests but lowers stability. Thus, it is preferable that the size of the upper plate support 202 is experimentally deduced and has the most suitable size of 900 mm×900 mm to be moved to up to 15 degrees.

The AC motors 212, 214, and 216 are fixed to the lower plate support 204, and the shafts of the AC motors 212, 214, and 216 are connected to the cranks 222, 224, and 226 through the shafts 232, 234, and 236 to transfer power to the upper plate support 202, thereby transferring the motions of the AC motors 212, 214, and 216 to the upper plate support 202. As shown in FIG. 6, a screw hole 233 that is screw-coupled to the crank 222 is formed at one side of the shaft 232 and four screw holes for fixing the shaft 232 to a lower surface of the upper plate support 202 are formed at an opposite side of the shaft 232.

The material of the shafts 232, 234, and 236 may be iron or an alloy. For example, the material of the shafts 232, 234, and 236 is iron that has a high strength and is inexpensive. The length of the shafts 232, 234, and 236 is determined such that the supports do not contact the AC motors 212, 214, and 216 even when the shafts of the cranks 222, 224, and 226 lower maximally, and corresponds to the height of the motion platform 200. For example, the length of the shafts 232, 234, and 236 is 175 mm, as experimentally deduced. The thickness of the shafts 232, 234, and 236 is 38 mm which is the same as the thickness of the shafts of the motors, such that the shafts 232, 234, and 236 do not buckle.

FIG. 6 illustrates a state in which a plate 232C connected to a joint 252 and a part 232A connected to a bearing are separately manufactured and coupled to opposite sides of a cylindrical shaft 232B to reduce the weights of the shafts 232, 234, and 236 according to an embodiment of the present invention.

The AC motors 212, 214, and 216 are operated under the control of the motion control unit 210, and move to express an inclination corresponding to a topology of Google Earth™ currently input the the PC 100. Three AC motors 212, 214, and 216 may be disposed such that a passenger may enjoy a sensation as a situation such as a descending road, an ascending road, a collision situation, and an abrupt situation, and a convexo-concave portion is transferred to the upper plate support 202. As shown in FIG. 8, the three AC motors 212, 214, and 216 may deviate from the center of the lower plate support 204 by an equal separation of 120 degrees, or may be disposed by different separations when the capacities of the AC motors 212, 214, and 216 are different. However, it is preferable that the AC motors 212, 214, and 216 of the same horsepower are disposed at the same separation.

For example, if there is a declining road in a map of Google Earth™ transmitted from the server 500 to the PC 100 and an HMD 400, the AC motors 212, 214, and 216 move the upper plate support 202 such that the bicycle 300 is inclined to the front side. In contrast, if there is a declining road in a map of Google Earth™ transmitted to the PC 100 and the HMD 400 through the server 500, the AC motors 212, 214, and 216 are controlled such that the upper plate support 202 is inclined to the front side.

The AC motors 212, 214, and 216 include single-phase motors and three-phase motors, and preferably, three-phase AC motors 212, 214, and 216 are employed. For example, the single-phase motors need to be installed while opposite poles of the main coil being mechanically separated by a distance, since an intensity of a rotation magnetic field abruptly overcoming a reverse rotation inertia while the motor receives a load since the rotation magnetic field deviates from the angle.

Since the three-phase motors form a rotation magnetic field while three sets of coils are sequentially magnetized so that a force is uniformly applied to the rotor forwardly and in reverse, inertial energy of the rotor is sufficiently absorbed and the rotor may be rotated in reverse. For example, the three-phase AC motor 212, 214, and 216 are three-phase AC motors 212, 214, and 216 of 1 horsepower that are disposed at a uniform separation and fixed to the lower plate support 204.

In designing the AC motors 212, 214, and 216, a prediction load substantially corresponding to Equation (1) needs to be supported. The load that should be overcome by the AC motors 212, 214, and 216 is as in Equation (1).

$$\text{Totalload} = (30 \text{ kg} + 150 \text{ kg} + 20 \text{ kg})*1.5 + 4 \text{ Kg}*4 + 8 \text{ kg}*3 + 2.5 \text{ kg}*3 = 347.5 \text{ kg} \quad (1)$$

In Equation (1), 30 kg indicates the weight of the bicycle, 150 kg indicates the weight of the user, 20 kg indicates the weight of the upper plate support 202, and 1.5 is a safety coefficient that considers stability in design. 4 kg*4 indicates four universal joints of 4 kg, and 8 kg*3 indicates the weight of the three shafts. 2.5 kg*3 indicates the weight of the three cranks 222, 224, and 226. Since this system is a three-shaft driving system, the three AC motors 212, 214, and 216 equally burden the load by ⅓. Thus, one AC motor 212, 214, and 216 may process a load of 350/3=117 kg.

Figure 13:
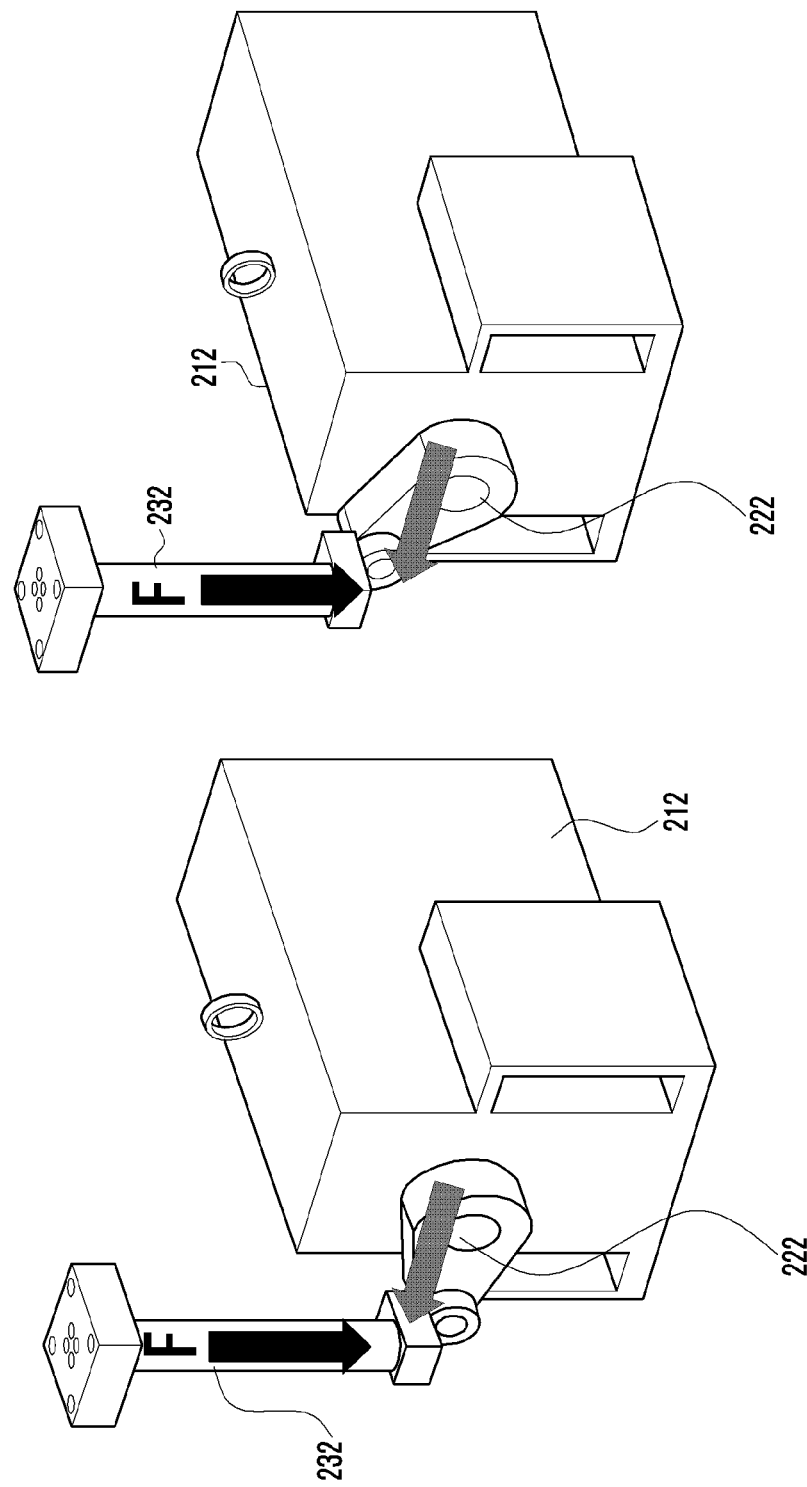
FIG. 13 is a view illustrating an angle between an angle of the shaft of the crank 222 and the AC motor 212 according to an embodiment of the present invention.

In one dimension, referriing to FIG. 13, when an angle between the shaft of the crank 222 and the AC motor 212 forms 90 degrees as in the left picture of FIG. 13, a maximum load is applied to the AC motors 212, 214, and 216. Then, the necessary torque may be calculated as in Equation (2).

$$\text{Torque} = 117 kgf * 0.081 \text{ m} * \left(\frac{9.81N}{kgf}\right) = 92.97 \text{ Nm} \quad (2)$$

The torque is about 100 Nm, considering the bearings connecting the shaft 232 and the shaft of the crank 222, and the frictional coefficient and the load inertial moment of the universal joint 252. If the safety coefficient is 1.5, the designed torque is 100 Nm*1.5=150 Nm. That is, an AC motor 212 that can generate 150 Nm is necessary.

The cranks 222, 224, and 226 connected to the AC motors 212, 214, and 216, respectively convert rotating energy of the motors 212, 214, and 216 to a linear motion. The AC motors 212, 214, and 216 are controlled by the motion control unit 210 and form inclinations on front and rear surfaces or side surfaces of the upper plate support 204 corresponding to a topology displayed on the screen according to Google Earth™. In the case of a convexo-concave portion or an impact situation, an impact corresponding to the convexo-concave portion or the impact situation is generated and transmitted to the upper plate support 204.

The material of the shafts of the cranks 222, 232, and 242 connected to the shafts of the AC motors 212, 214, and 216 may be iron or an alloy. In an embodiment of the present invention, the shafts of the cranks 222, 232, and 242 are formed of iron, which is strong and inexpensive. If a distance between the shaft of the AC motor 212 and the shaft of the other AC motors is approximately 600 mm, the length of the cranks 222, 224, and 226 should be designed to be 81 mm when the inclination angle is 15 degrees.

Figure 11:
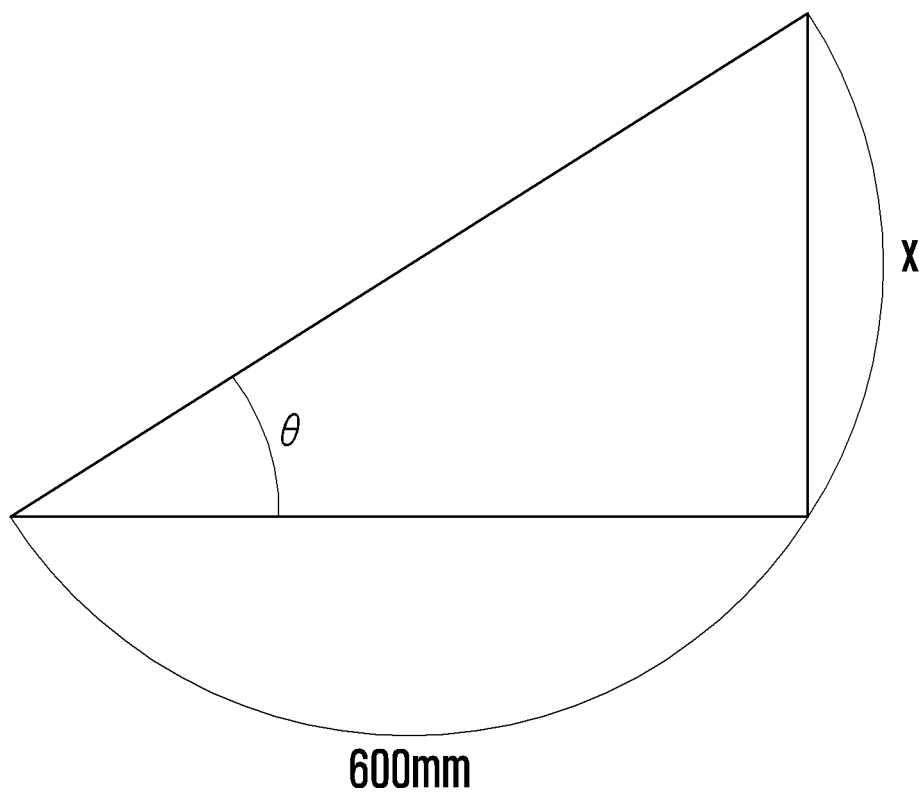
FIGS. 11 and 12 illustrate how the length of a shaft of the crank 222 is obtained by using a tangent formula of a trigonometry according to an embodiment of the present invention.
Figure 12:
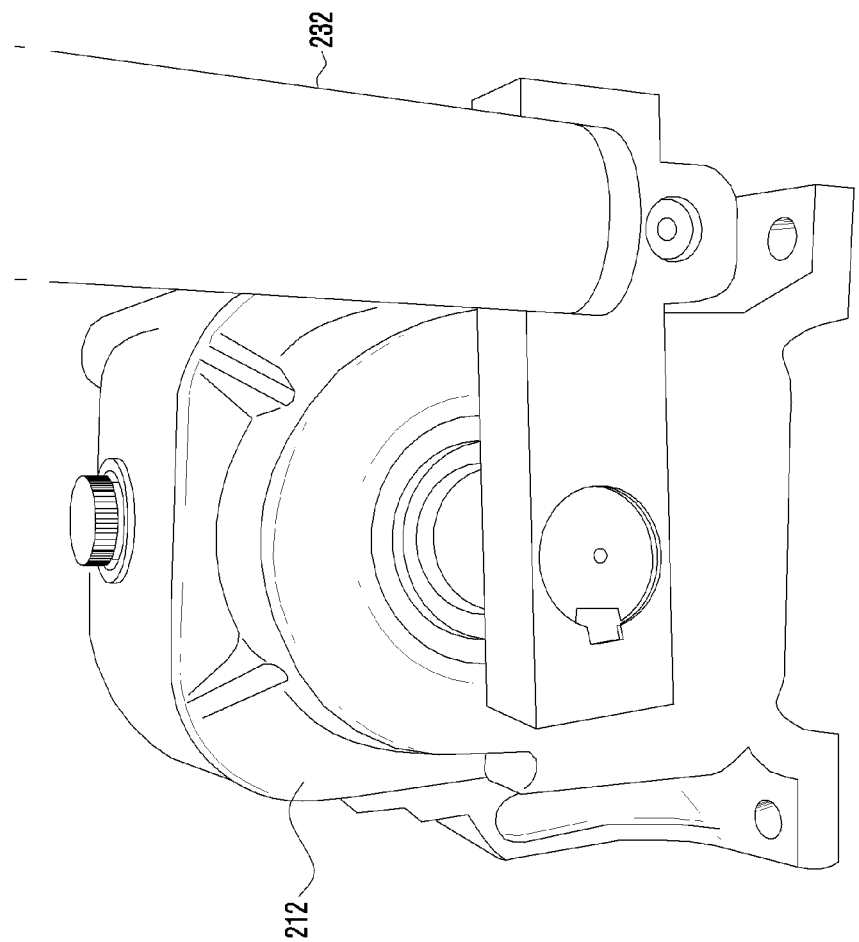

Referring to FIGS. 11 and 12, a length of the shaft of the crank 222 may be obtained by using the tangent formula. The tangent formula is as in Equation (3).

$$\tan 15° = x/600 \text{ mm} \quad (3)$$

Although if an x value is obtained from Equation (3), the result value of x is approximately 160.7695 mm, and if a length of the crank shaft is calculated from the result value, the length becomes 160.76 mm, the system is a link system so that the length of the crank shaft should be approximately 81 mm by the formula of the result value(x) of Equation (3) divided by 2=80.38 mm. That is, when the length of the shafts of the cranks 222, 224, and 226 is 1, the difference between the top point of each shaft and the bottom point of each shaft is 2, so that the result value(x) of Equation (2) divided by 2. That is, a value of approximately 81 mm should be the length of the shaft of the crank 222, and the shafts of the cranks 222, 224, and 226 are designed such that the upper plate moves between −15 degrees and 15 degrees. The thickness of the shafts of the cranks 222, 224, and 226 is the same as the thickness of the shafts of the motors, that is, 38 mm, to prevent buckling.

Pitch and roll angles of the corresponding simulation are received from the PC 100 to control the AC motors 212, 214, and 216, a roll height and a pitch height that are height differences between motors for realizing the pitch and roll angles are obtained by using Equations (4) to (6). Equations for controlling the AC motors 212, 214, and 216 that move the upper plate support by the obtained roll height and pitch height are as in Equations (4) to (6).

$$h1 = 175 \text{ mm} + (\text{Roll Height}/2) \quad (4)$$

$$h2 = 175 \text{ mm} - (\text{Roll Height}/2) + (\text{Pitch Height}/2) \quad (5)$$

$$h3 = 175 \text{ mm} - (\text{Roll Height}/2) - (\text{Pitch Height}/2) \quad (6)$$

As in Equations (4) to (6), the AC motors 212, 214, and 216 may set the angle of the upper plate support 202 without damaging the AC motors 212, 214, and 216.

When the heights of the AC motors 212, 214, and 216 deviate a range between a minimum height of 94 mm and a maximum height of 256 mm, the heights are corrected. A corrected rotation angle of the motor that is necessary for forming the height of the motor is obtained by using the Second Law of Cosines. The rotation angle (θ) for correction of the motor is expressed as in Equation (7), as follows.

$$\theta = \cos^{-1} \frac{(a^2 + c^2 - b^2)}{2ac} \quad (7)$$

In Equation (7), a indicates the height of the AC motors 212, 214, and 216, b indicates the length of the shafts 232, 234, and 236, and c indicates the length of the shafts of the cranks 222, 224, and 226. FIG. 23 is a view illustrating Equations for controlling the AC motors 212, 214, and 216 according to an embodiment of the present invention.

A PID control is performed by using a difference between a target rotation angle of the AC motors 212, 214, and 216 and the current angles of the AC motors 212, 214, and 216.

Figure 24:
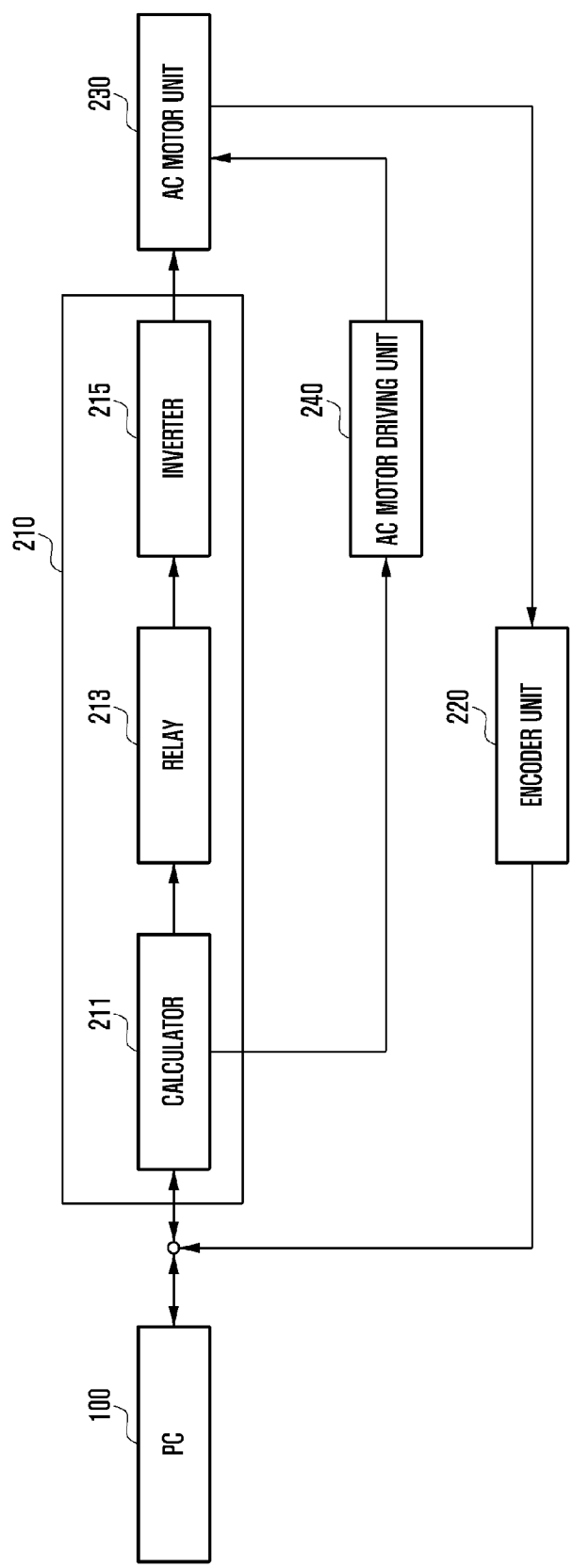
FIG. 24 is a view schematically illustrating a motion control unit designed to control an AC motor according to an embodiment of the present invention.

FIG. 24 is a view schematically illustrating a motion control unit designed to control an AC motor according to an embodiment of the present invention. Referring to FIG. 24, the motion control unit 210 includes a calculator 211, a relay 213, and an inverter 215. The calculator 211 receives a pitch and a roll angle received from the PC 100 to calculate a frequency and a rotation direction corresponding to a height for operating the AC motor 212 according to Equations (3) to (5), and transmits the calculated frequency and rotation direction to the inverter 215 via the relay 213. The inverter 215 controls the AC motors 212, 214, and 216 according to the frequency and the rotation direction received from the calculator 211. The changed angle values of the AC motors 212, 214, and 216 are detected by the encoder 208, and are fed back to the calculator 211 to allow the calculator 211 to correct an error value according to Equation (7) based on the detected angle value.

The calculator 211 may be realized by using an ATMega128 chip. The motion control unit 210 controls a plurality of AC motors 212, 214, and 216 in reality, but it will be easily appreciated by those skilled in the art that FIG. 24 illustrates only one AC motor 212 for the sake of convenience.

Figure 25:
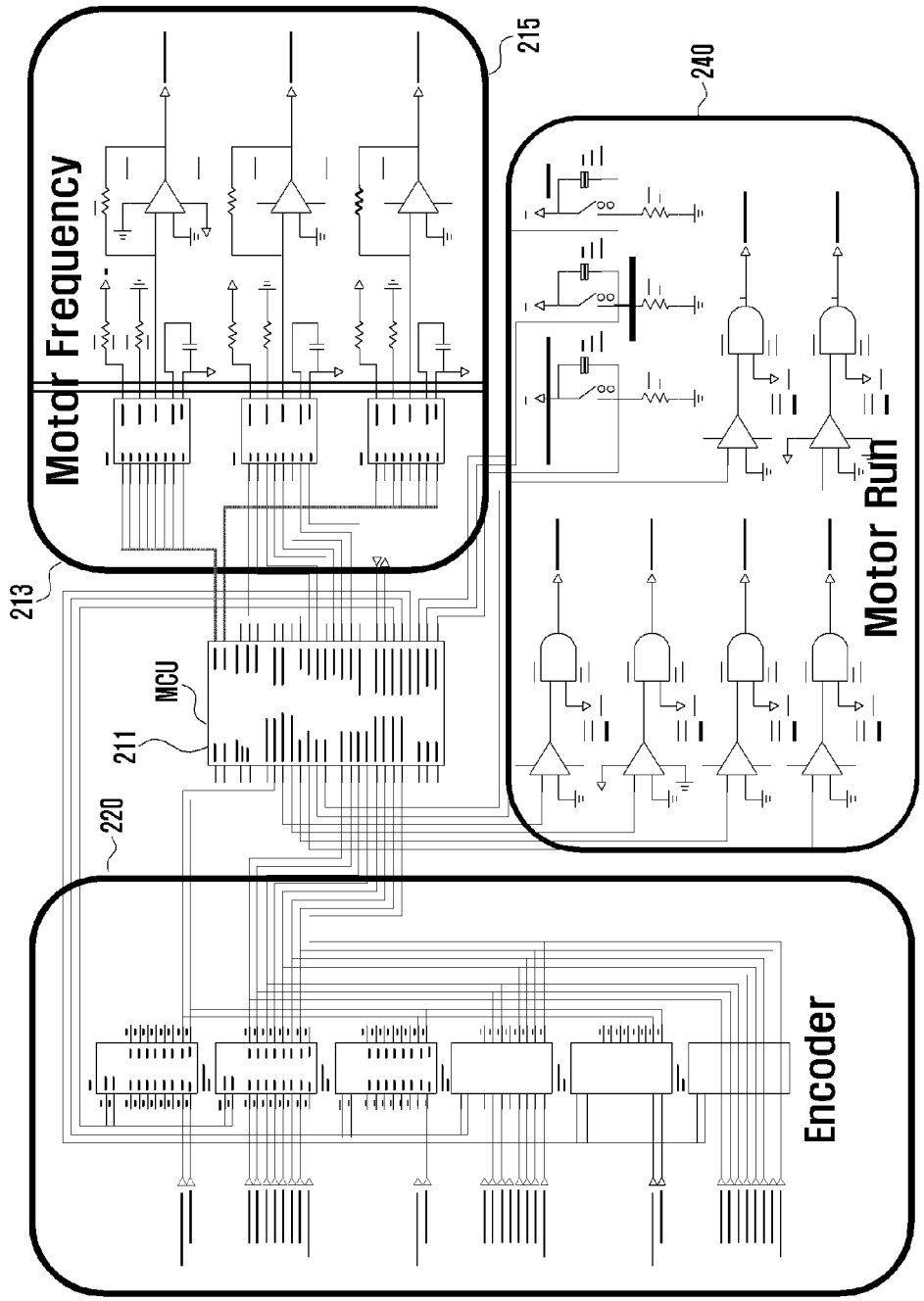
FIG. 25 is a circuit diagram illustrating the motion control unit of a motion platform and peripheral configurations according to an embodiment of the present invention.

FIG. 25 is a circuit diagram illustrating the motion control unit of a motion platform and peripheral configurations according to an embodiment of the present invention. Referring to FIG. 25, the ATMega128 chip employed as the calculator 211 requires 65 I/O pins. T encoder 242 employs a 74HC541 chip that is a three-phase buffer to receive outputs of the encoders 242 of the three motors by using an Enable signal while swapping the outputs in order to reduce the number of used pins. The current locations of the AC motors 212, 214, and 216 may be detected by using the outputs of the encoder 242.

The signal received from the calculator 211 is transmitted to the inverter 215 through the relay 213. Methods of converting an operation frequency with the inverter 215 are realized by using a loader volume, a voltage signal, a current signal, and communication. Preferably, a voltage operation method of accurately securing an output voltage is employed to convert an operation frequency. Thus, the inverter includes a digital/analog converter circuit for adjusting an operation frequency.

The inverter 215 adjusts a value of an output pin of the calculator 211 and outputs a voltage of 0 V to 12 V to convert operation frequencies of the AC motors 212, 214, and 216 from 0 Hz to 400 Hz.

The motor driving unit 240 is connected to a setting unit 340 through the PC 100 to generate a signal for driving the AC motors 212, 214, and 216 forward or reverse or stopping the AC motors 212, 214, and 216 under the control of the motion control unit 210 by using an emergency signal brake or a start signal input through the setting unit by the user. It is preferable that the motor driving unit 240 includes a Complementary Metal Oxide Sensor (CMOS) type AND gate to provide forward, reverse, and stop signals of the motors.

Figure 22:
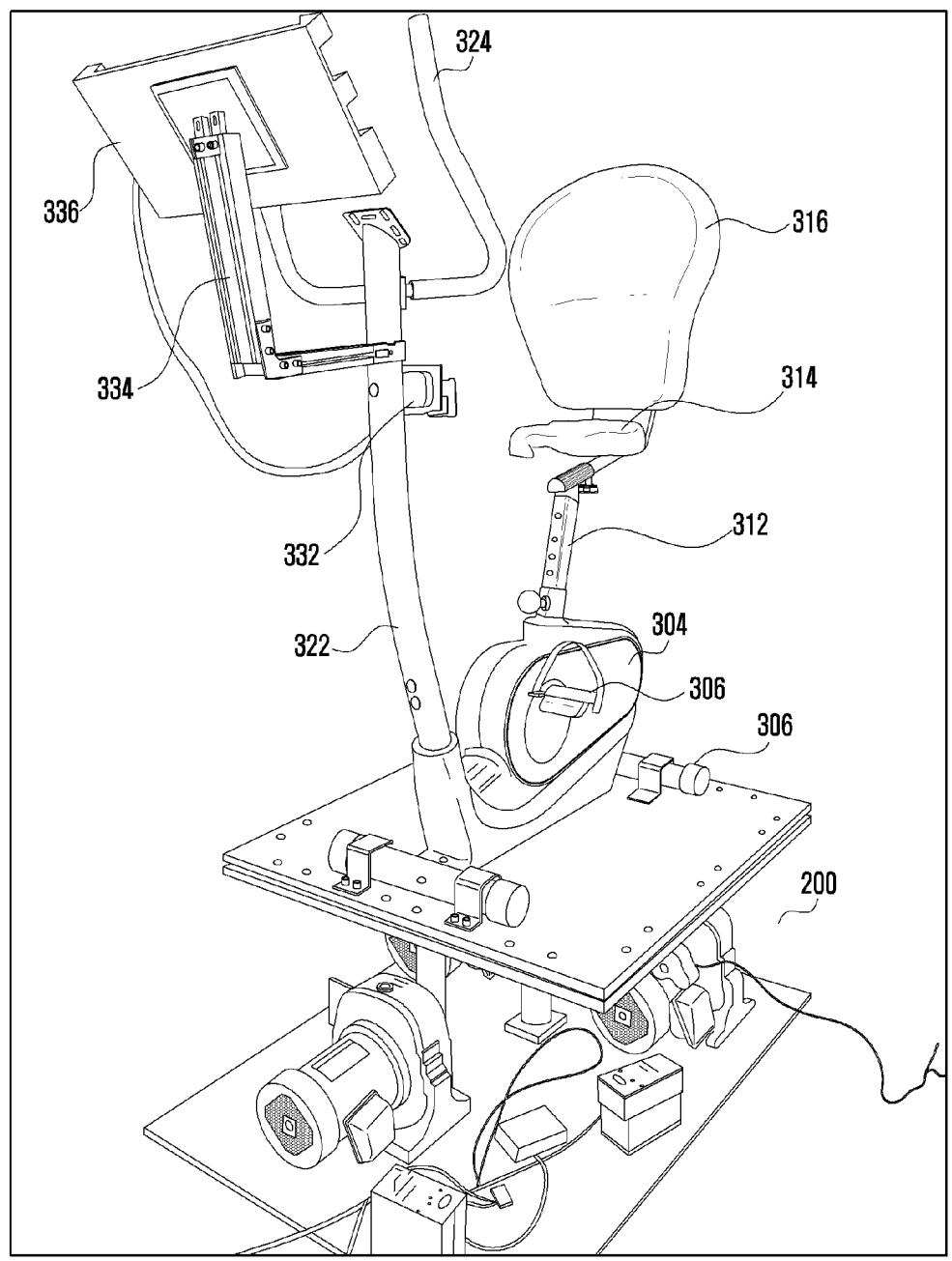
FIG. 22 is a picture illustrating the virtual hiking system according to an embodiment of the present invention.

FIG. 22 illustrates the virtual hiking system according to an embodiment of the present invention. Referring to FIG. 22, the bicycle 300 is fixed onto the upper side of the upper plate support 202. The bicycle 300 is configured such that a lower support 302 is fixed to an upper portion of the upper plate support 202, a body 304 is formed on the lower support 302, and pedals 306 are formed on opposite surfaces of the body 304. A first support 312 extends from the pedal 306 integrally or in an assembled fashion to correspond to the length of the leg of the user at an upper side of the body 304. A seat 314 is provided at an end of the first support 312. A shock absorber or a spring may be selectively installed at a connecting portion of the first support 312 and the seat 314 to increase a riding sensation felt by the user. The height of the first support 312 may be adjusted to adjust the height of the seat 314.

Figure 21:
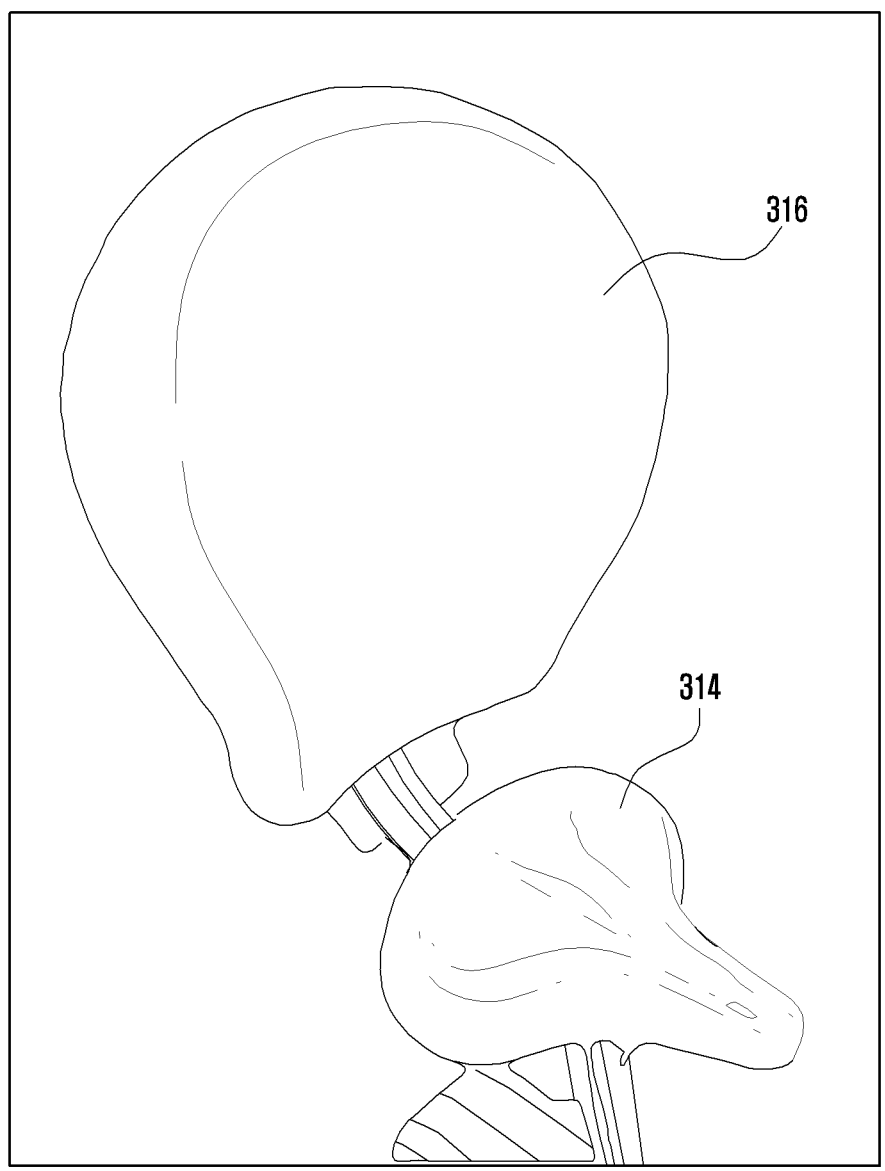
FIG. 21 illustrates a back support 316 provided on a rear surface of a seat 314 for safety of a passenger according to an embodiment of the present invention.

Referring to FIG. 21, a back support 316 is provided on a rear surface of the seat 314 for safety of a passenger. The angle of the back support may be adjusted. For example, when an upward slope is displayed on the simulation, the motion platform 200 is inclined backwards so that passenger's center of gravity may fall backwards, which is dangerous. Thus, the back support 316 provides for the safety of the passenger when the inclination angle is inclined, and may be provided to the seat 314 integrally or in an assembled fashion.

Figure 20:
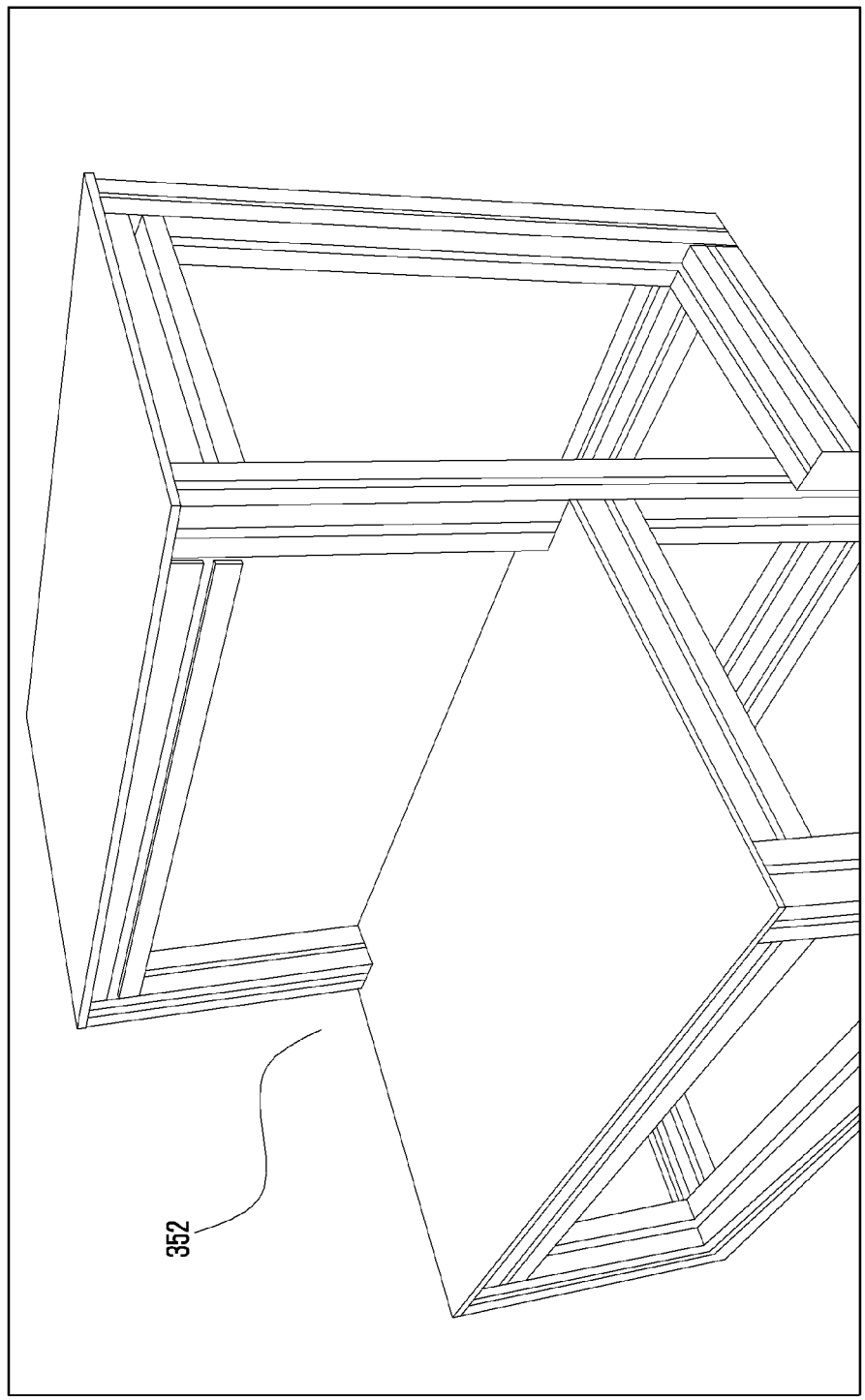
FIG. 20 illustrates a step by which a motion platform is ascended according to an embodiment of the present invention.

FIG. 20 illustrates a step by which a user ascends onto the motion platform according to an embodiment of the present invention. Referring to FIG. 20, a passenger should ascend the motion platform 200 before riding the bicycle 300, and the height of the motion platform 200 is high enough that a passenger cannot ascend the motion platform 200 at one time. Thus, step 352 is configured such that the motion platform 200 is ascended by using step 352, which may be integrally formed with or assembled with the motion platform 200.

Figure 15:
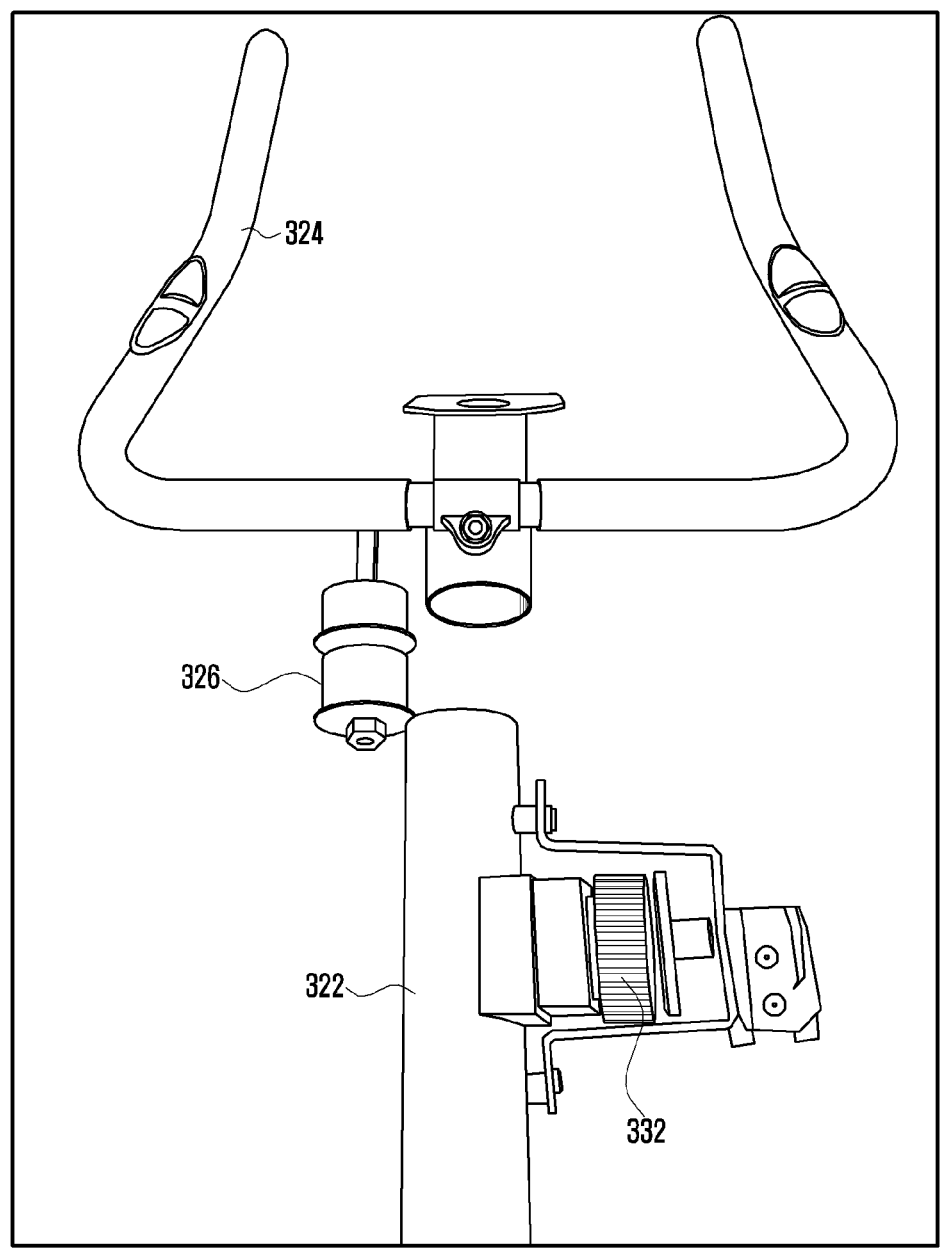
FIG. 15 illustrates a handle 324 rotatable with respect to a second support 322 according to an embodiment of the present invention.

Referring again to FIG. 22, a second support 322 extends upwards from an opposite side of an upper portion of the body 304, and a rotatable handle 324 is provided at an end of the second support 322. Referring to FIG. 15, the handle 324 is rotatable with respect to the second support 322. That is, in order to allow the handle 324 of the bicycle exerciser to be rotated to the left and to the right, a rotation unit is manufactured as a separate product and a potentiometer 326 is attached to the handle 324 to measure a rotation angle of the handle 324.

Figure 16:
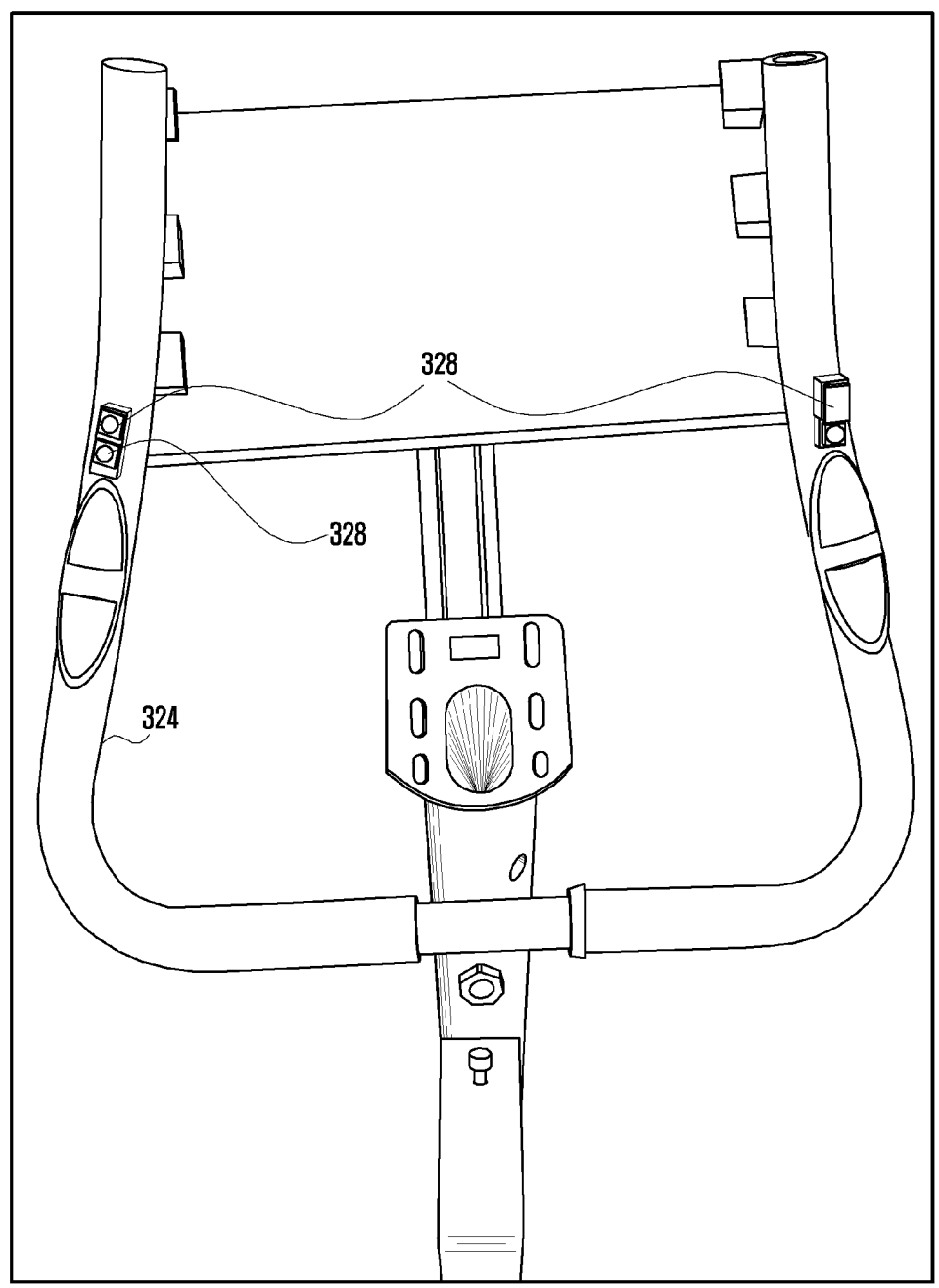
FIG. 16 illustrates that the handle 324 is equipped with a switch 328 having a brake function, an emergency stop function, an initial position function, and a start function according to an embodiment of the present invention.

Referring to FIG. 16, a switch 328 having a brake function, an emergency stop function, an initial position function, and a start function is provided in the handle 324.

The switch 328 includes a brake button, an emergency stop button, an initial position setting button, and a start button. The brake button serves as a brake during the simulation, and the emergency button stops the pedal during an emergency regardless of the simulation. The initial position setting button sets a hiking start position. For example, a desired hiking road or a hiking path may be selected on the simulation. The start button starts the set simulation, such that the simulation is operated corresponding to the pedal if the pedal is worked on the selected hiking path. That is, the start button is used to maintain an initial position before and after a passenger ascends the motion platform.

Figure 17:
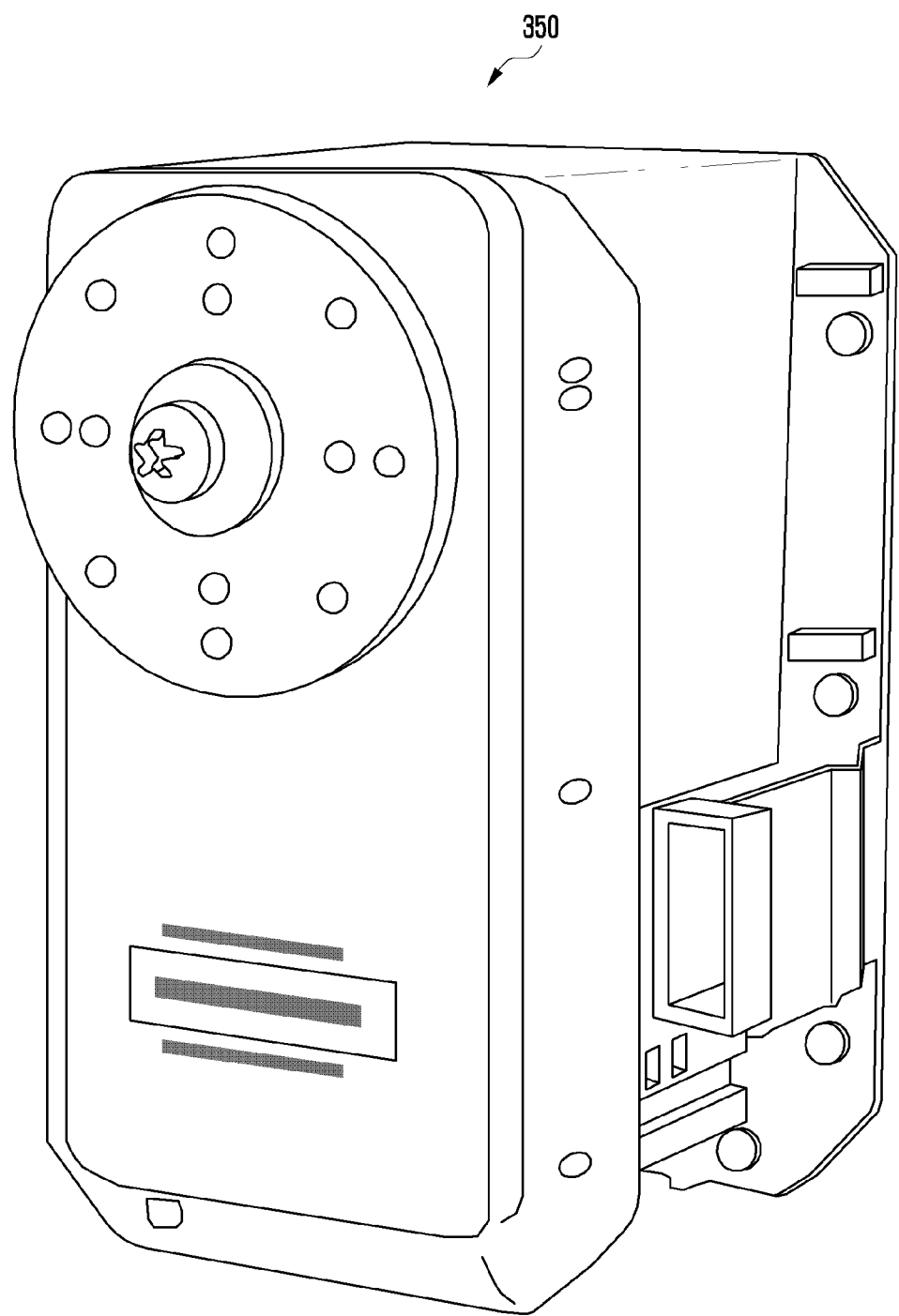
FIG. 17 is a view illustrating a servo motor according to an embodiment of the present invention.
Figure 18:
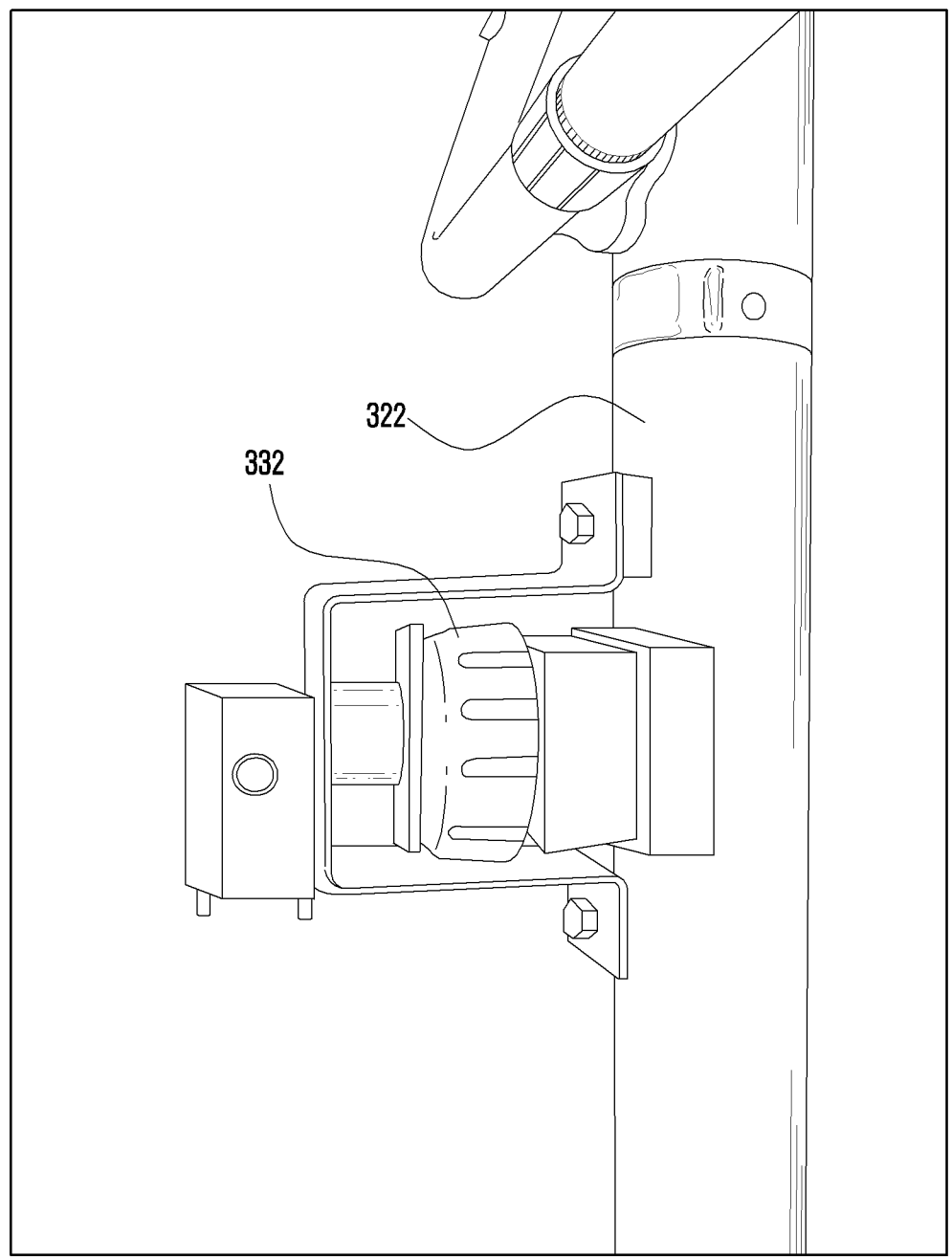
FIG. 18 is a view illustrating an installation state of an exercise intensity adjusting lever according to an embodiment of the present invention.

FIG. 17 is a view illustrating a servo motor according to an embodiment of the present invention. FIG. 18 is a view illustrating an installation state of an exercise intensity adjusting lever. Referring to FIGS. 17 and 18, an exercise intensity adjusting lever 332 is provided at one side of the second support 322. The exercise intensity adjusting lever 332 is connected to the servo motor 350 to adjust a resistance force that resists against a force applied to the pedal 306. That is, if the exercise intensity adjusting lever 332 is set to be strong, a servo motor 350, as illustrated in FIG. 2, connected to the exercise intensity adjusting lever 332 and provided in the body 304 is operated.

If the exercise intensity adjusting lever 332 is manually operated, a resistance force applied to the pedal is adjusted to adjust a quantity of motion by stages. When hiking is performed in an automatic mode, the servo motor 350 generates a resistance force in the pedal 306 to automatically adjust a quantity of motion according to an inclined surface viewed on the simulation. That is, the servo motors 350 may automatically or manually adjust a resistance value.

Figure 19:
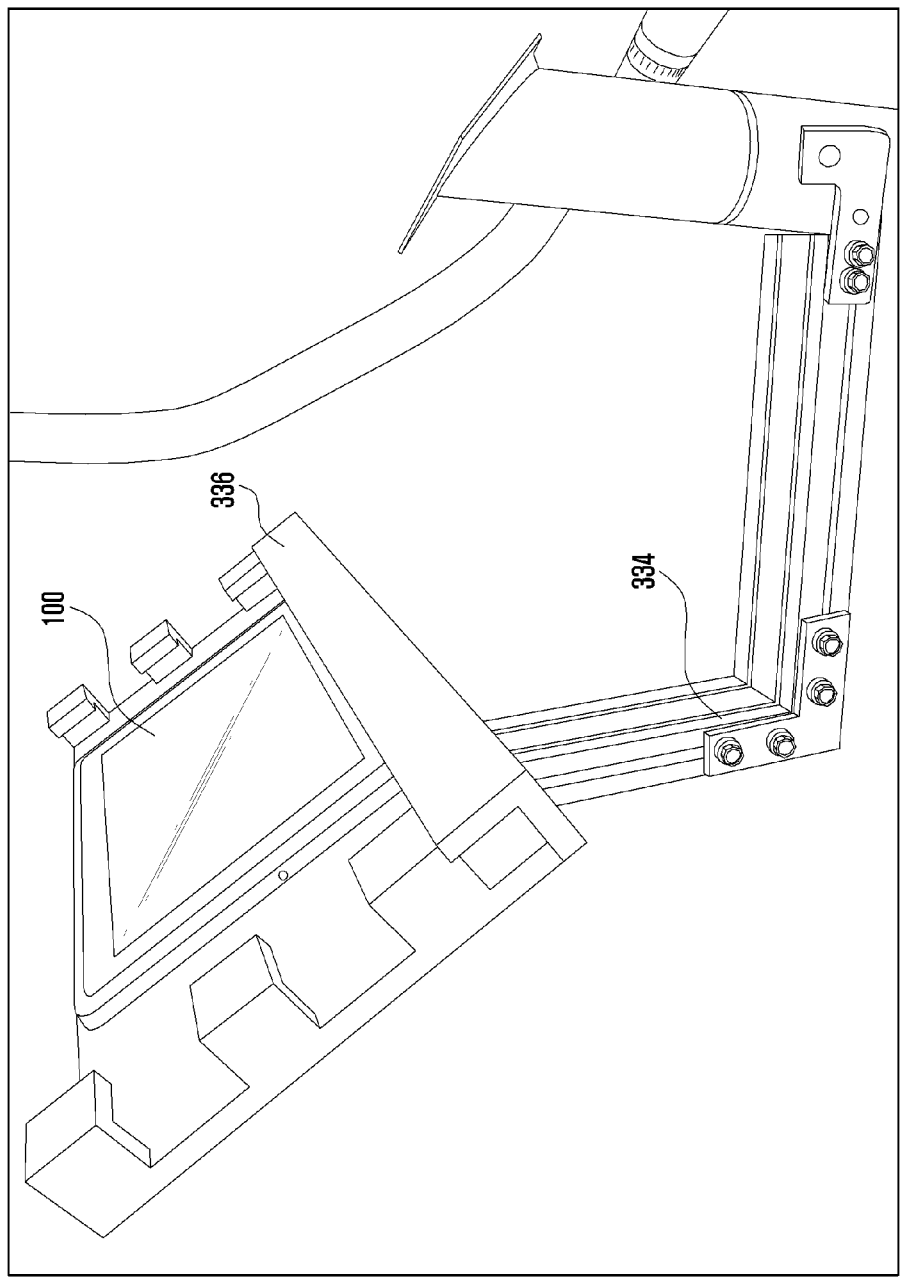
FIG. 19 illustrates that a holder 336 on which a PC 100 or a tablet PC and an HMD 400 that is to be connected to the PC 100 are positioned is installed at an end of a third support 334 according to an embodiment of the present invention.

Referring to FIG. 19, a third support 334 extending from one side of the second support 322 in an assembled fashion is installed. A holder 336 on which a PC 100 or a tablet PC and an HMD 400 connected to the PC 100 is installed at an end of the third support 334. The holder 336 may be fixedly installed or may be installed to be rotated by 90 to 360 degrees about an end of the third support 334. The PC 100 may be positioned on an upper surface of the holder 336 and the HMD 400 may be positioned on the upper surface of the holder 336.

A photo interrupt 320, as illustrated in FIG. 2, for detecting a speed of the body 304 of the bicycle 300, in particular, a rotary plate rotated by the pedal 306 is embedded in the pedal 306. The photo interrupt 320 is connected to the pedal 306 of the bicycle 300 to detect a rotation at a circumference of a rotary plate, such as the pedal 306, moving at the same speed, and the bicycle control unit 310 may calculate a virtual speed of the bicycle 300 by using a counter function.

FIG. 2 is a system block diagram schematically illustrating the virtual hiking system according to an embodiment of the present invention. Referring to FIG. 2, the virtual hiking system mainly includes a motion platform 200, a bicycle 300, a PC 100, a server 500, and an HMD 400.

As described above, the motion platform 200 includes a plurality of AC motors 230, a plurality of cranks 222, 224, and 226 and shafts 232, 234, and 236 corresponding to the plurality of AC motors 212, 214, and 216. If operations of the AC motor unit 230, in particular, rotations of the AC motors 212, 214, and 216 are detected and transmitted to the motion control unit 210, the motion control unit 210 may calculate a current inclined angle of the upper plate support 202.

The motion control unit 210 controls the AC motor unit 230 such that the upper plate support 202 is moved at an angle corresponding to a simulation image transmitted from the PC 100. The motion control unit 210 may detect rotations of the AC motor unit 230 through the encoder unit 220 and identify whether the upper plate support 202 is currently converted to an angle corresponding to a corresponding simulation image.

The communication unit 250 in the motion control unit 210 provides a communication channel for communications with the PC 100. For example, the communication unit 250 may transmit rotation information of the AC motors 212, 214, and 216 detected by the encoder unit 220 through a wireless or serial communication line, rotate the AC motors 212, 214, and 216 in response to a control signal from the PC 100 to set an angle of the upper plate support 202 to an angle corresponding to a simulation image, or transfer an impact corresponding to an impact or a convexo-concave portion to the upper plate support 202 to allow a bicycle passenger to feel the corresponding impact.

The PC 100 includes a control unit 110, a storage unit 120, and a communication unit 130.

The storage unit 120 may store a part of Google Maps™, a part of Google StreetView™, a test program, and a map. The storage unit 120 may further store a virtual hiking program.

The control unit 110 is connected to the server 500 according to selection of a user, and sets such that Google Maps™, Google StreetView™, and the virtual hiking program stored in the storage unit 120 are linked. The control unit 110 may execute Google Maps™, Google StreetView™, and a virtual hiking program stored in the storage unit 120 according to selection of the user. The user may select a desired area though Google Maps™ and select a desired hiking distance through Google StreetView™.

Figure 3:
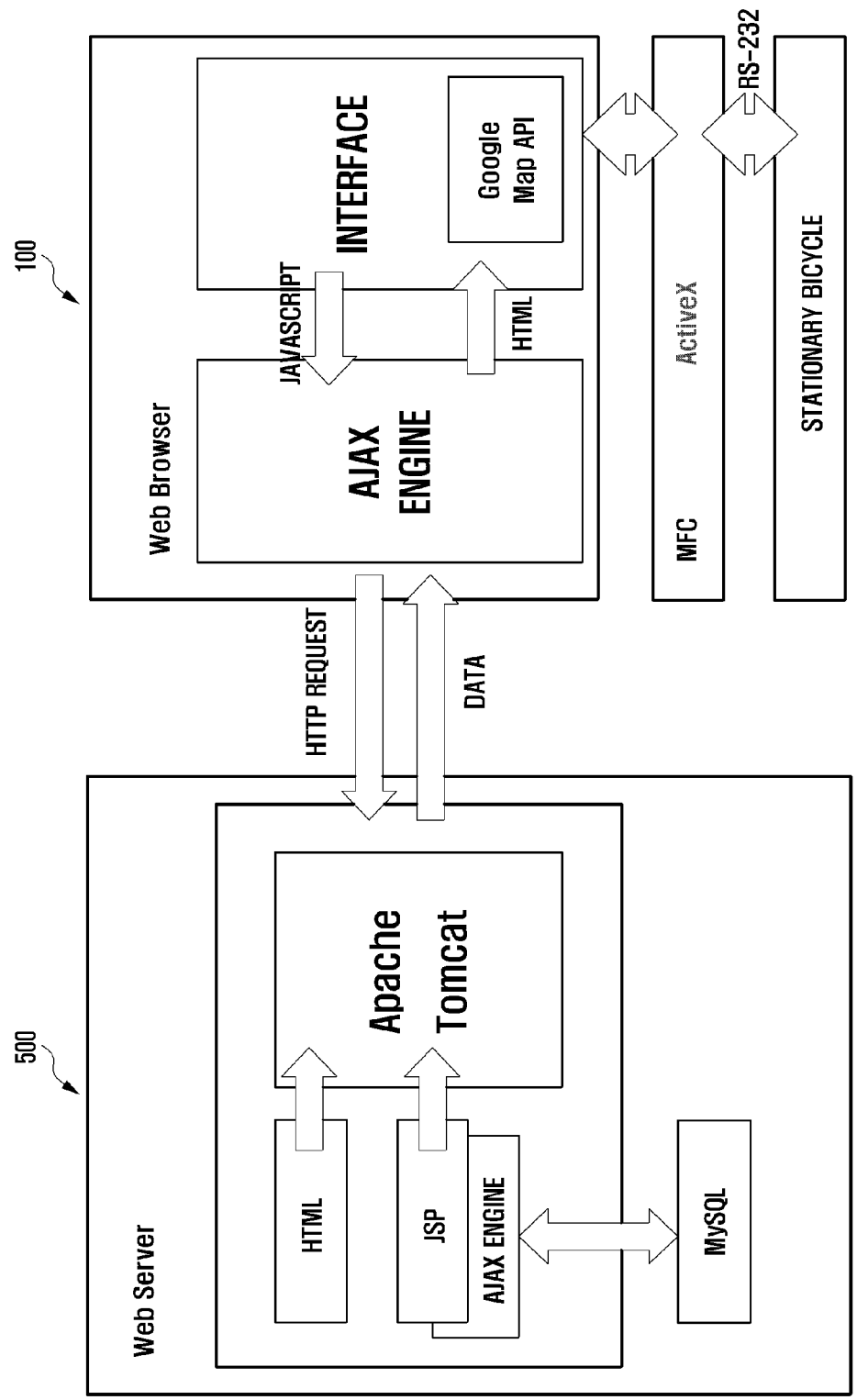
FIG. 3 is a view schematically illustrating a software block provided between a server and a PC according to an embodiment of the present invention.

FIG. 3 is a view schematically illustrating a software block provided between a server and a PC according to an embodiment of the present invention. Referring to FIG. 3, an information database 510 is produced by MySQL. The platform of the server 500 is produced by associating Apache Tomcat. The platform of the server 500 is produced by using JSP, HTML, and AJAX engines to support the network of the platform. In particular, JSP, HTML, and AJAX engines are used to produce a homepage.

Firmware mounted to the PC 100 is produced by an AJAX engine to be conveniently associated with the server 500. The interface uses Google Map API. The stationary bicycle 200 and 300 including the bicycle 300 and the motion platform 200 and the PC 100 are associated with each other by using Active X. The communication of the PC 100 and the stationary bicycle 200 and 300 is realized by RS-232 Standard that is a serial communication standard. In addition, RS-232 is realized in communications of the PC 100 and the HMD 400. However, as known, it will be easily appreciated that communications of the PC 100, the stationary bicycle 200 and 300, and the HMD 400 may be realized by a near field wireless communication standard.

Figure 30:
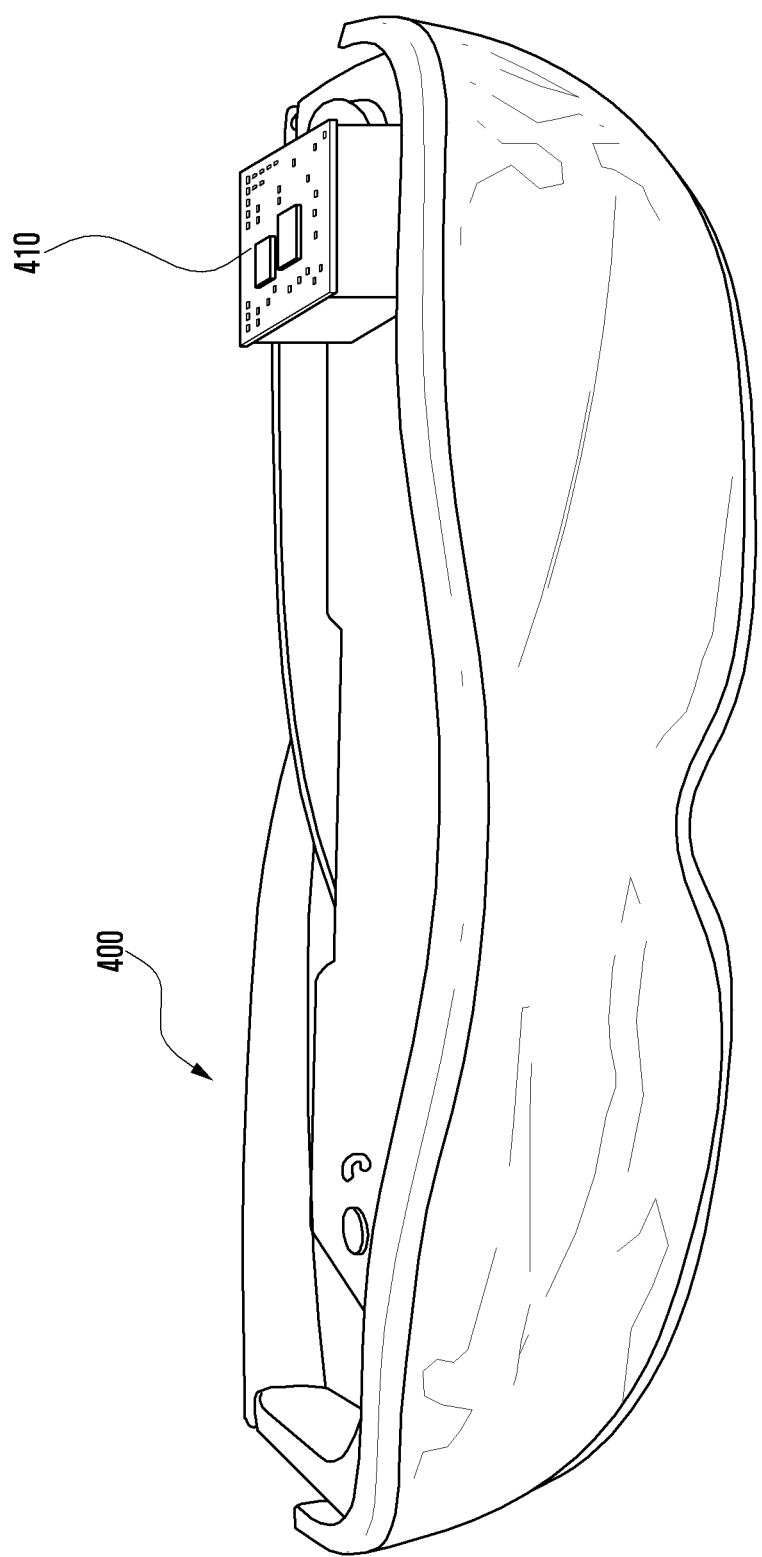
FIG. 30 is a view illustrating an HMD according to an embodiment of the present invention.

FIG. 30 is a view illustrating an HMD according to an embodiment of the present invention. Referring to FIG. 30, the HMD 400 is connected to the PC 100. The HMD 400 is configured to display an image through a display unit 420, as illustrated in FIG. 2, adjacent to the HMD 400 while being worn like glasses. The HMD includes a communication unit 430, an Altitude Heading and Reference System (AHRS) 410, and a display unit 420, as illustrated in FIG. 2.

The HMD 400 displays a simulation screen input through the PC 100 to provide a virtual reality simulation screen to a passenger.

The communication unit 430 of the HMD 400 provides a wireless or wired channel with the PC 100. The HMD 400 communicates with the PC 100 through a wireless or wired channel.

AHRS 410 detects yaw and pitch values of the HMD 400 and transmits the yaw and pitch values to the PC 100. The PC 100 outputs a corresponding screen image, and outputs the image, that is, a simulation image of Google StreetView™ corresponding to the gaze of the user through the display unit 420 according to the angle of the gaze.

The display unit 420 displays a simulation screen as a background. The display 420 may display a motion state of the user input through the PC 100, for example, exercise information such as a pulse, a hiking speed during an excise, and an exercise distance.

The communication unit 430 of the HMD 400 provides a communication channel for receiving a simulation screen received through the server 500 and the PC 100. The communication unit 430 provides a communication channel for transmitting yaw and pitch values detected by the AHRS 410 to the PC 100.

Referring back to FIG. 2, the bicycle 300 includes a bicycle control unit 310, a photo interrupt 320, a pulse detecting sensor 330, a setting unit 340, a servo motor 350, a potentiometer 360, and a communication unit 370.

The photo interrupt 320 is embedded in the body of the bicycle 300, and calculates a movement distance corresponding to the speed of the pedal 306 to produce information on a distance by which the bicycle 300 virtually moves. The movement distance information is transmitted to the PC 100, which displays a movement state on a simulation screen of Google StreetView™ corresponding to the distance. The HMD 300 also displays a screen in a moving state in response to the traveled distance.

Figure 28:
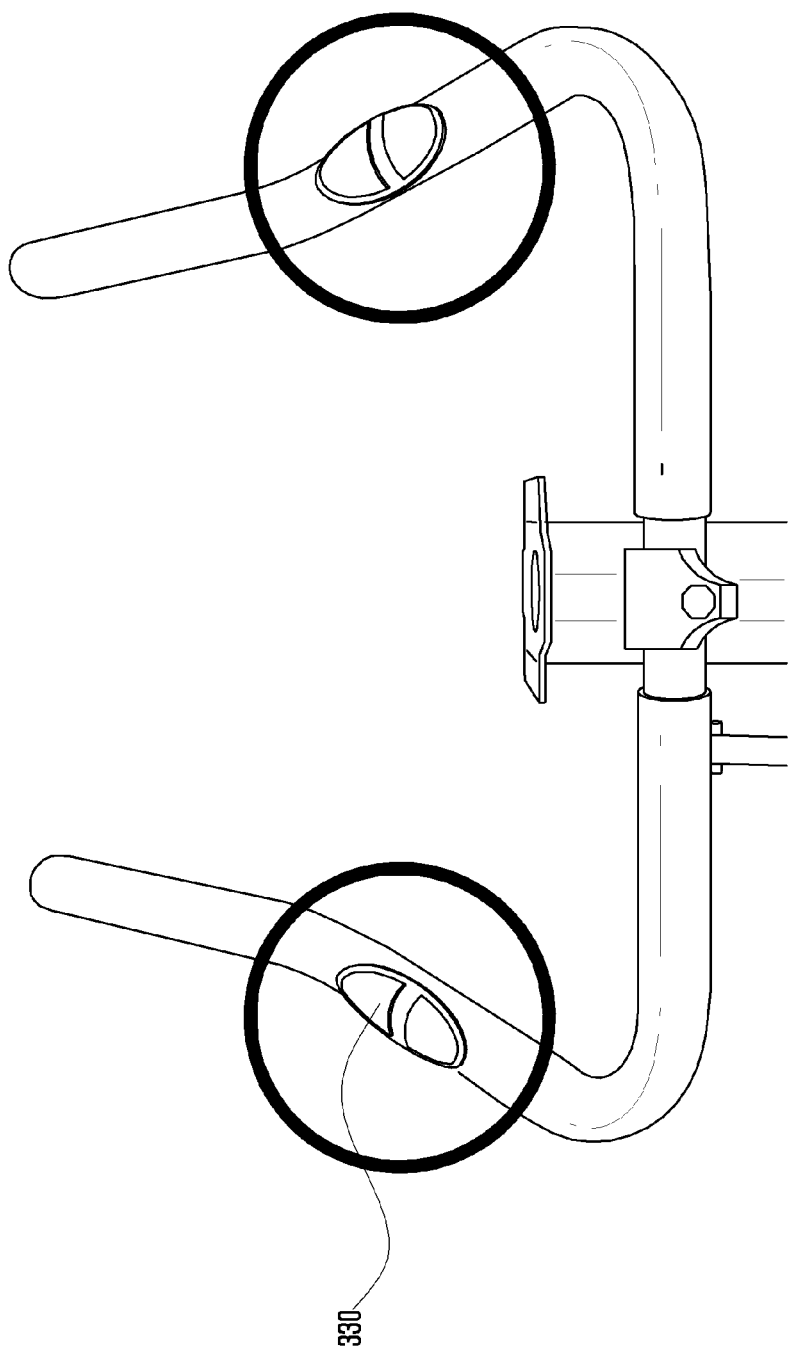
FIG. 28 is a view illustrating a handle including a pulse detecting sensor according to an embodiment of the present invention.
Figure 29:
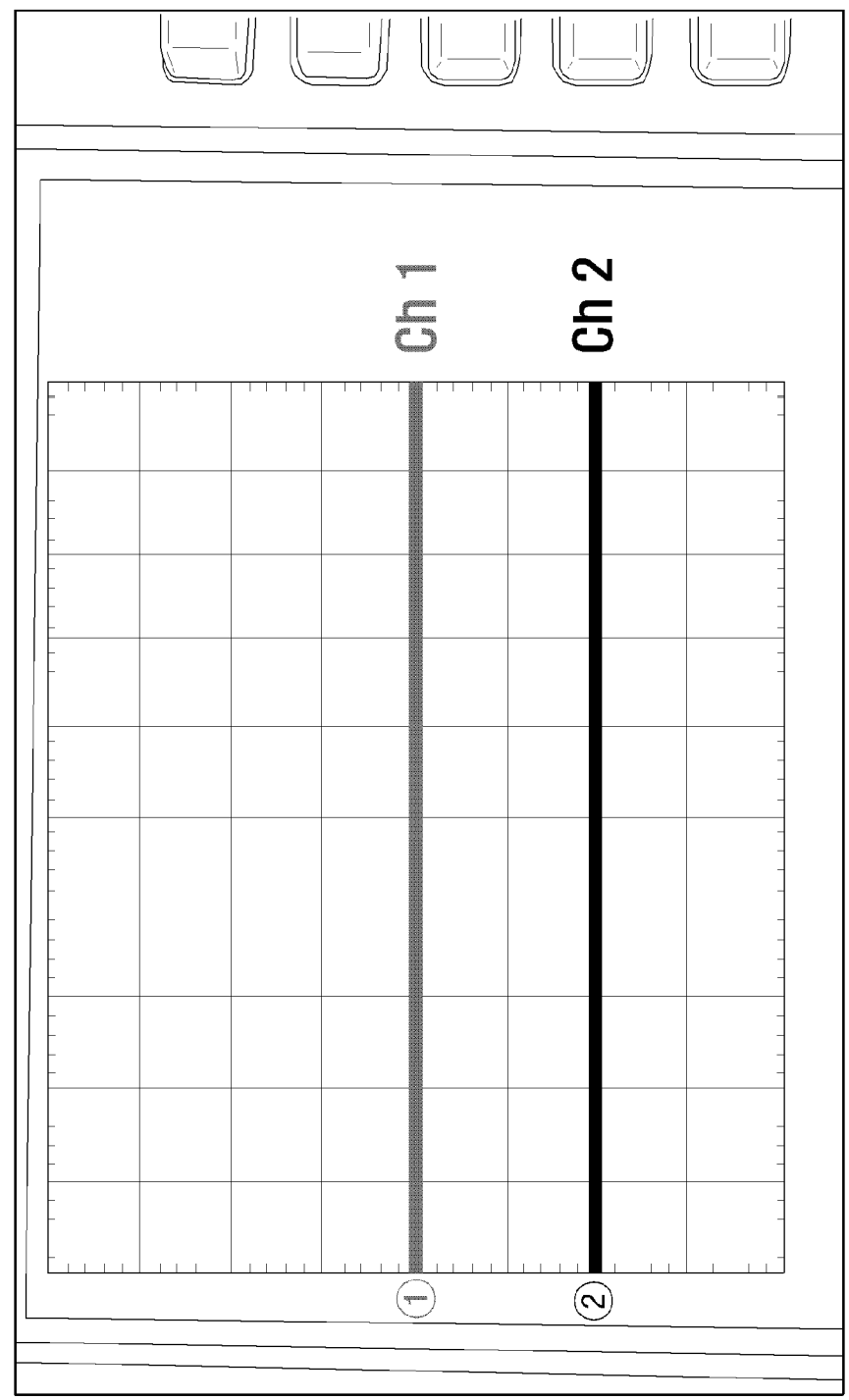
FIG. 29 is a view illustrating an output waveform of the pulse detecting sensor that appears in the oscilloscope according to an embodiment of the present invention.

FIG. 28 is a view illustrating a handle including a pulse detecting sensor according to an embodiment of the present invention. FIG. 29 is a view illustrating an output waveform of the pulse detecting sensor that appears in the oscilloscope according to an embodiment of the present invention. Referring to FIGS. 28 and 29, the pulse detecting sensor 330 is formed at one side of the handle 324 of the bicycle 300 to detect a pulse of the user while touching the pulse detecting sensor 330.

The pulse detecting sensor 330 displays the detected pulse on a display screen of the PC 100, or displays a pulse state at one side of the HMD 400 through the PC 100 to allow the user to easily check their own user state. The pulse detecting sensor 330 detects an input voltage value and an output voltage value and calculates a pulse of the user as shown in FIG. 29. The input voltage of the pulse detecting sensor 330 is 1.7 V and a voltage and a resistance value of the sensor decrease from 2.7 V to 0 V and 300 kΩ to 200 kΩ. The pulse detecting sensor 300 constitutes a dedicated circuit and measures a voltage input from the dedicated circuit to measure a pulse. The number of pulses per minute may be calculated by using a counter function of an MCU and be displayed on the PC 100 or the HMD 400.

As described earlier with reference to FIG. 1, the setting unit 340 illustrated in FIG. 2 allows the user to escape from a dangerous situation according to a manipulation of the switch 328 having a plurality of buttons, or sets and selects an initial screen and controls such that an intensity of an exercise may be adjusted. The setting unit 340 may allow the user to set an intensity of an exercise through the exercise intensity adjusting lever 332 or automatically adjust an intensity of an exercise corresponding to a simulation displayed on Google StreetView™.

If the exercise intensity adjusting lever 332 is set to provide a strong degree of resistance, the servo motor 350 adjusts a resistance force applied to the pedal according to stages to adjust a quantity of exercise.

The servo motor 350 may adjust an exercise intensity according to the viewed simulation screen. For example, if the stages of the servo motor are stages 1 to 8 and an upward slope is displayed on the simulation, the intensity of exercise is set to 4 or higher. Thus, if the servo motor 350 increases the resistance applied to the pedal 306 corresponding to the upward slope, an intensity of exercise of the user increases. If a downward slope is displayed on the simulation, the servo motor 350 lowers the resistance applied to the pedal 306 corresponding to the declination of the downward slope. Thus, if a downward slope is displayed on the simulation, the intensity of exercise of the user decreases.

The potentiometer 360 is attached to the handle 324, and measures a rotation angle of the handle 324, transmits the measured rotation angle to the PC 100, and changes the rotation angle of the handle 324 corresponding to a simulation screen such as Google StreetView™. For example, if the handle is rotated to the left while a distance is displayed on the simulation and the pedal 306 is worked, a simulation screen corresponding to a left turn is displayed.

The servo motor 350 automatically adjusts a quantity of exercise by generating a resistance force in the pedal 306 according to an inclined surface viewed on the simulation when hiking is performed in an automatic mode. The servo motor 350 may adjust a resistance force from an intensity of stage 1 to an intensity of stage 8 automatically or manually.

Figure 27:
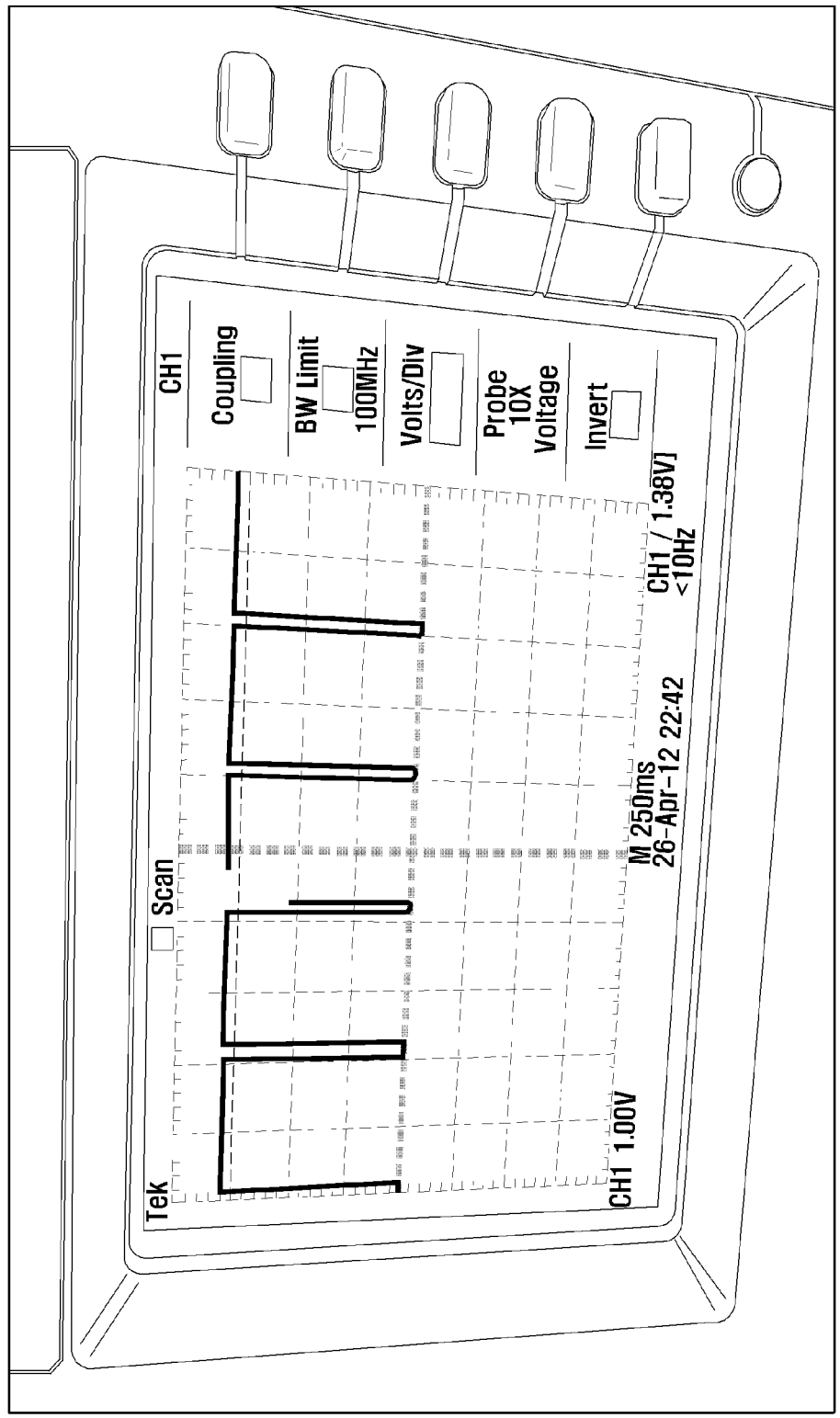
FIG. 27 illustrates a voltage waveform appearing on an oscilloscope and obtained by detecting voltages output from a photo interrupt according to an embodiment of the present invention.

FIG. 27 illustrates a voltage waveform appearing on an oscilloscope and obtained by detecting voltages output from a photo interrupt according to an embodiment of the present invention. Referring to FIG. 27, the photo interrupt 320 detects a speed of the body 304 of the bicycle 300, in particular, the rotary plate rotated by the pedal 306. The photo interrupt 320 is connected to the pedal 306 of the bicycle 300. If the photo interrupt 320 detects a rotation at a circumference of the rotary plate moving at the same speed as that of the pedal 306, the bicycle control unit 310 may calculate a virtual speed of the bicycle 300 by using a counter function.

Figure 26:
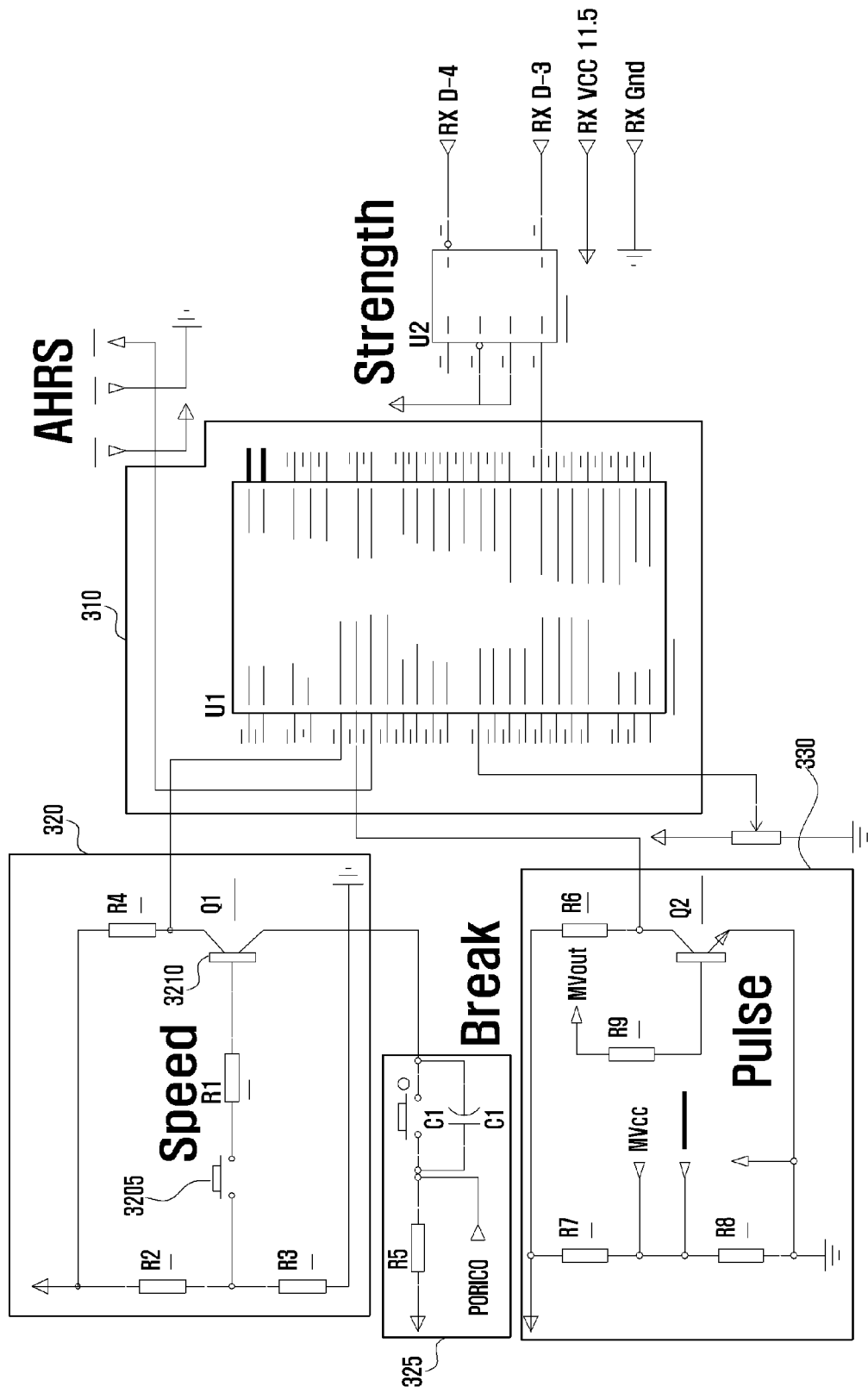
FIG. 26 is a circuit diagram for controlling an apparatus of a bicycle according to an embodiment of the present invention.

FIG. 26 is a circuit diagram for controlling an apparatus of a bicycle according to an embodiment of the present invention. Referring to FIG. 26, a circuit is provided in the body 306 of the bicycle 300. The bicycle control unit 310 receives speed information of the bicycle from the photo interrupt 320. A light emitting diode 3205 and a photo transistor 3210 are formed between the rotary plate connected to the pedal 306 to be rotated to detect the speed of the bicycle. That is, a change in the amount of current flowing through the photo transistor receiving light emitted from the light emitting diode 3205 displayed on the switch is detected such that a speed of the bicycle is detected.

A brake input port 325 for receiving a brake signal if the brake signal is generated through the manipulation of the brake button of the switches 328 is displayed under the photo interrupt 320. If the brake signal is received, the bicycle 300 travels gradually slower under the control of the bicycle control unit 310 and then the pedal 306 of the bicycle 300 is stopped.

The pulse detecting circuit 330 is disposed under the brake input port 325. The pulse detecting circuit 330 detects a pulse of the user and transmits the detected signal to the PC 100 through the bicycle control unit 310.

Figure 31:
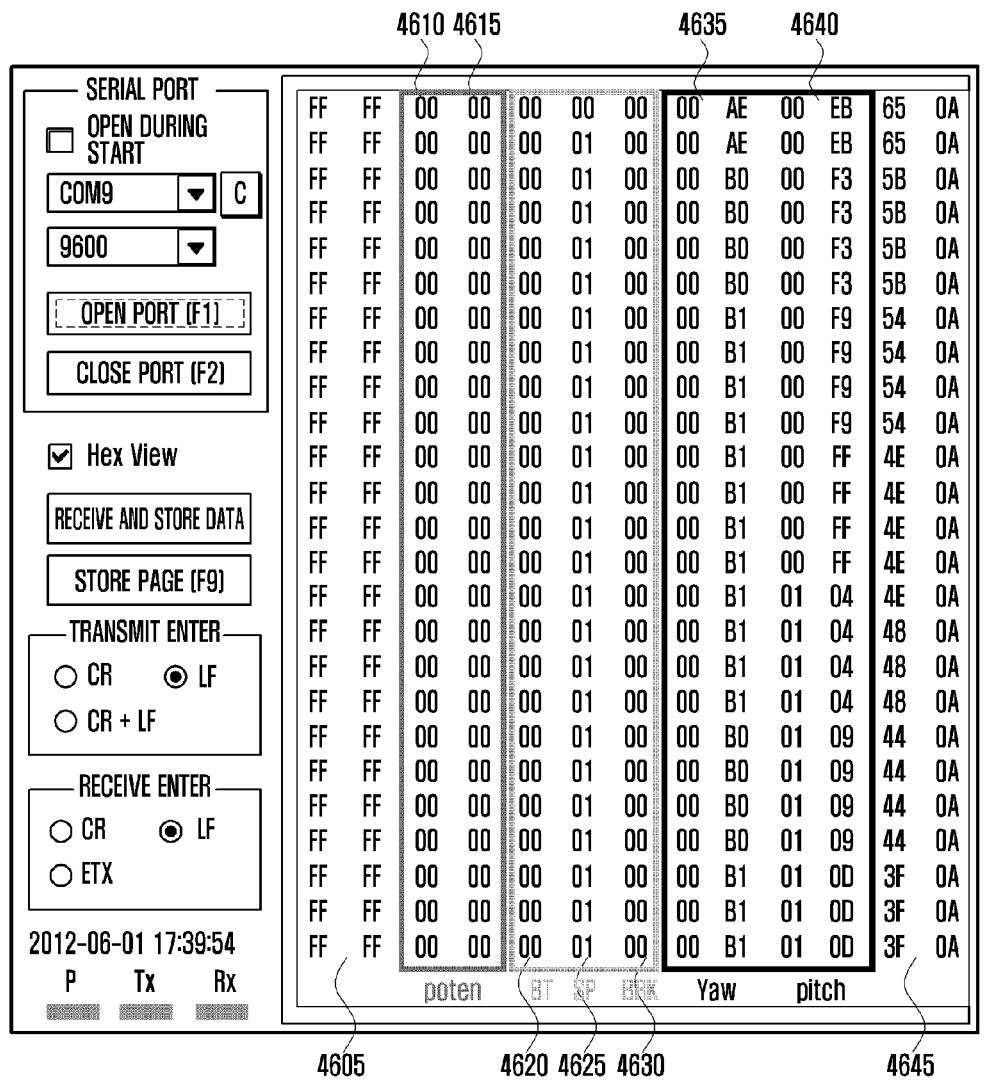
FIG. 31 is a view illustrating a packet table transmitted and received between systems of FIG. 46 according to an embodiment of the present invention.

FIG. 46 is a packet table illustrating a packet configuration for communication between systems according to an embodiment of the present invention. FIG. 31 is a view illustrating a packet table transmitted and received between systems of FIG. 46 according to an embodiment of the present invention.

Referring to FIGS. 46 and 31, a packet for transmitting information in use for a serial communication or a wireless communication includes header information 4605 containing reception and transmission side information and information on the packet, rotation angle information 4610 and 4615 of the potentiometer 326 according to a rotation angle of the handle 324, pulse number information 4620, virtual speed information 4620 of the bicycle, brake operation information 4630, yaw information 4635, pitch information 4640, and check sum information 4645 for checking an error.

Referring to FIG. 31, a packet generated when the bicycle 300 and the PC 100 communicate with each other is shown, and the header information 4605 displays a transmission side and a reception side, and contains information on the packet. The header information 4605 allocates 16 bits.

The rotation angle information 4610 and 4615 classifies displacement information of the potentiometer 326 according to a rotation angle of the handle 324 to the right side and the left side and allocates 8 bits, respectively.

The pulse number information 4620 allocates 8 bits if the number of pulses detected by the pulse detecting sensor 330 is displayed.

The virtual speed information 4620 of the bicycle displays a speed detected by the photo interrupt 320 of the bicycle 300 and allocates 8 bits.

The brake operation information 4630 displays an operation of the brake and an intensity of the brake through the switch 328, and allocates 8 bits.

The yaw information 4635 represents an upward/downward angle of the gaze of the user input through the HMD 400 and the PC 100 and allocates 16 bits.

The pitch information 4640 represents a leftward/rightward angle of the gaze of the user input through the HMD 400 and the PC 100 and allocates 16 bits.

The check sum information 4645 follows an asynchronous method, detects an error by using a simple and light check sum, and allocates 16 bits.

The check sum is operated by adding a message element (usually bits) and storing result data. By performing the operation, the same result may be deduced regardless of the user, a result on an integrity check may be compared, and damage of the message may be identified by identifying the check sum.

In the embodiment for transmitting and receiving data, a communication method may be realized through a serial communication method or a wireless method. Preferably, this method is realized through a serial communication method.

Figure 32:
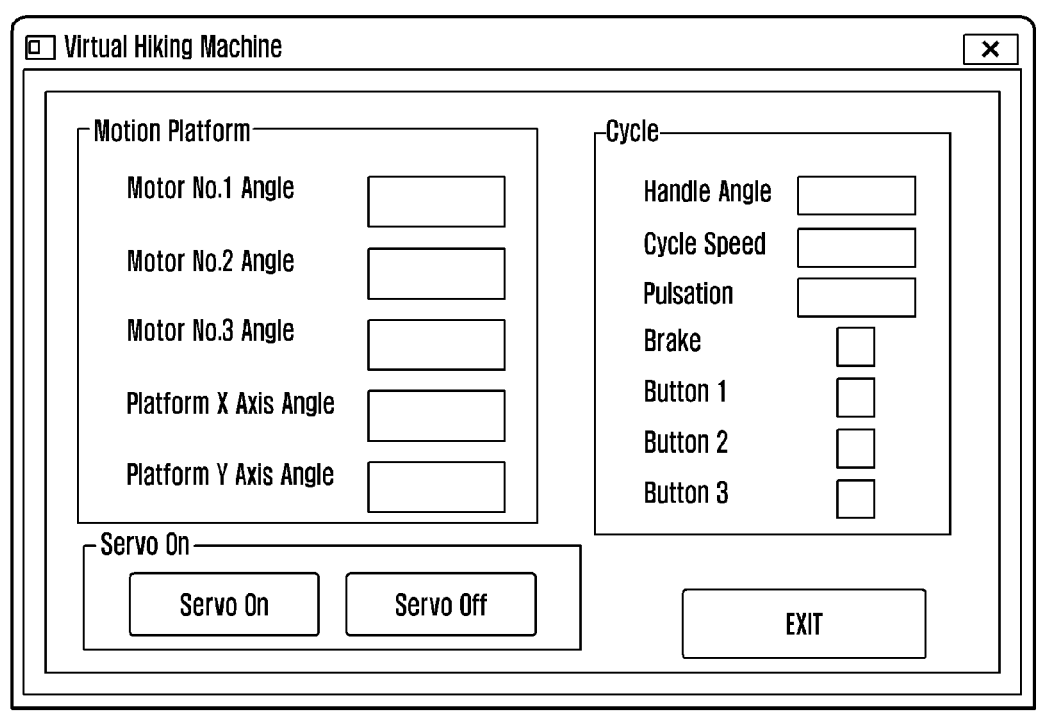
FIG. 32 is a view illustrating an execution screen of a test program by which an operation of the apparatus can be identified and verified according to an embodiment of the present invention.

FIG. 32 is a view illustrating an execution screen of a test program by which an operation of the apparatus can be identified and verified according to an embodiment of the present invention. Referring to FIG. 32, a control of the AC motors 212, 214, and 215 on the shafts of the motion platform and angles of the main frame with respect to the X and Z axes are input to the text program, and a corresponding angle is output.

A sensor data output box allows identification of output values of the sensors to text the sensors. A specific motion (such as a collision or a jump) button allows an operation of the motion platform to be identified. For example, if an impact situation of the apparatus due to a collision is displayed, a corresponding collision state is output.

Figure 33:
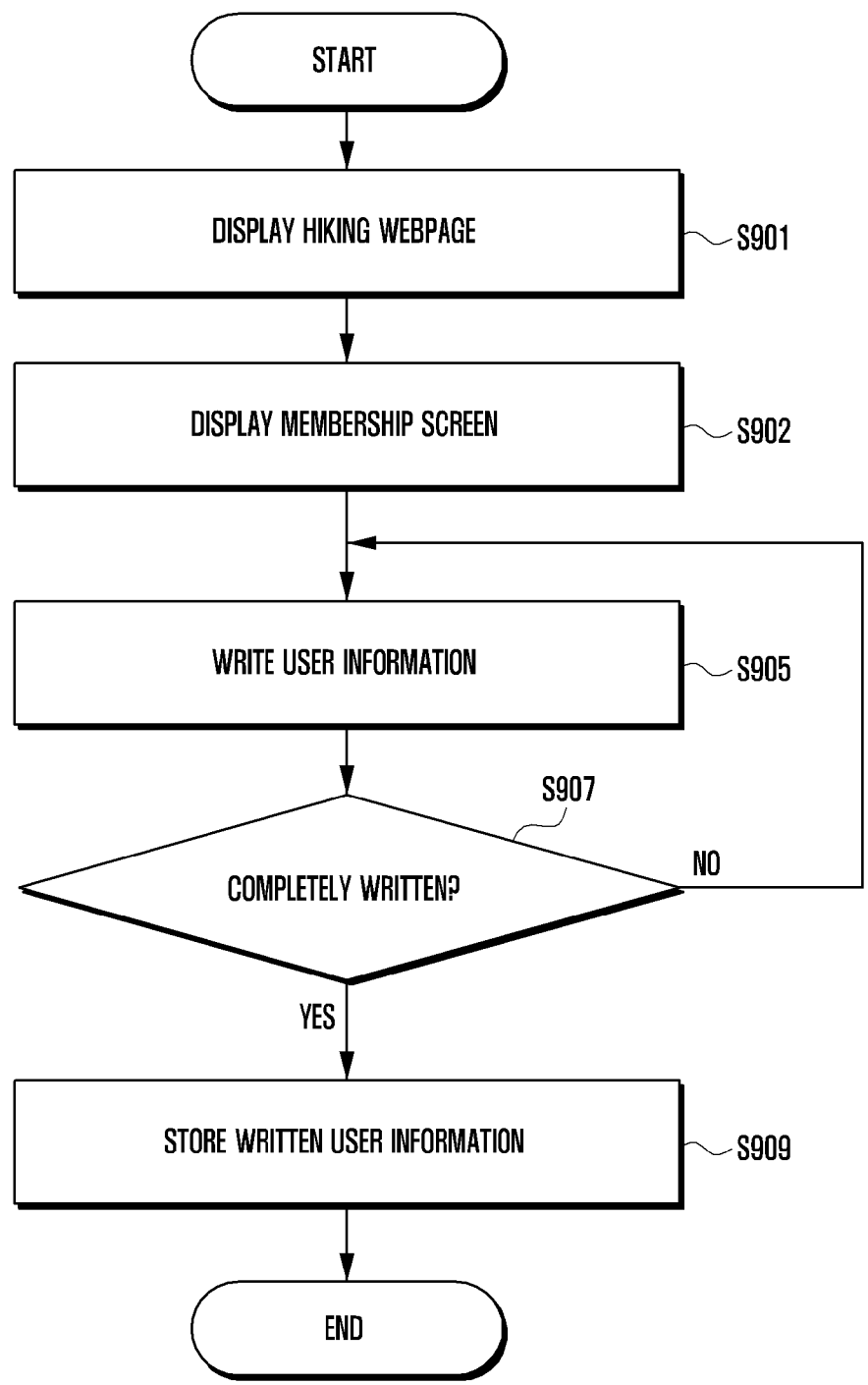
FIG. 33 is a flowchart schematically illustrating a process of subscribing to a virtual hiking homepage through a server according to an embodiment of the present invention.
Figure 36:
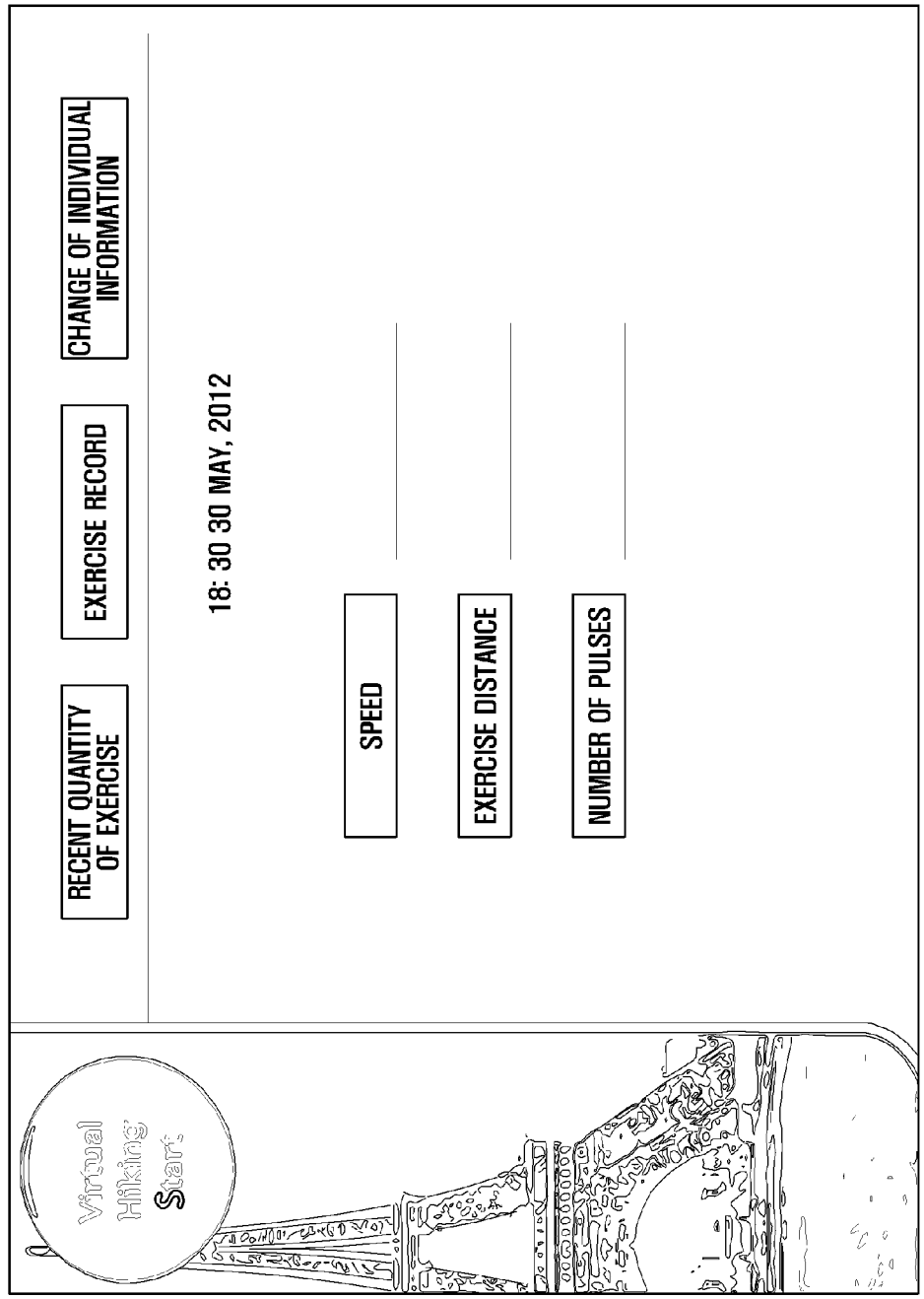

FIG. 33 is a flowchart schematically illustrating a process of subscribing to a virtual hiking homepage through a server according to an embodiment of the present invention. Referring to FIG. 33, a subscriber connects to the server 500 through a network 550. In step S901, the server 500 stores a virtual hiking webpage according to a request of the user, and displays the virtual hiking webpage on the PC 100. The server 500 includes a virtual hiking webpage as in FIG. 36 such that a game may be performed and its own information and an exercise state may be identified.

The webpage provides a user information page such that the user may output an exercise record (a recent exercise time, an exercised distance, and an exercise speed) most recently performed by the user may be output through a chart or a graph so that the information can be easily recognized by the user, and individual information may be corrected or an intensity of exercise may be changed. The server 500 has subscriber information, and for example, includes an information database.

Figure 35:
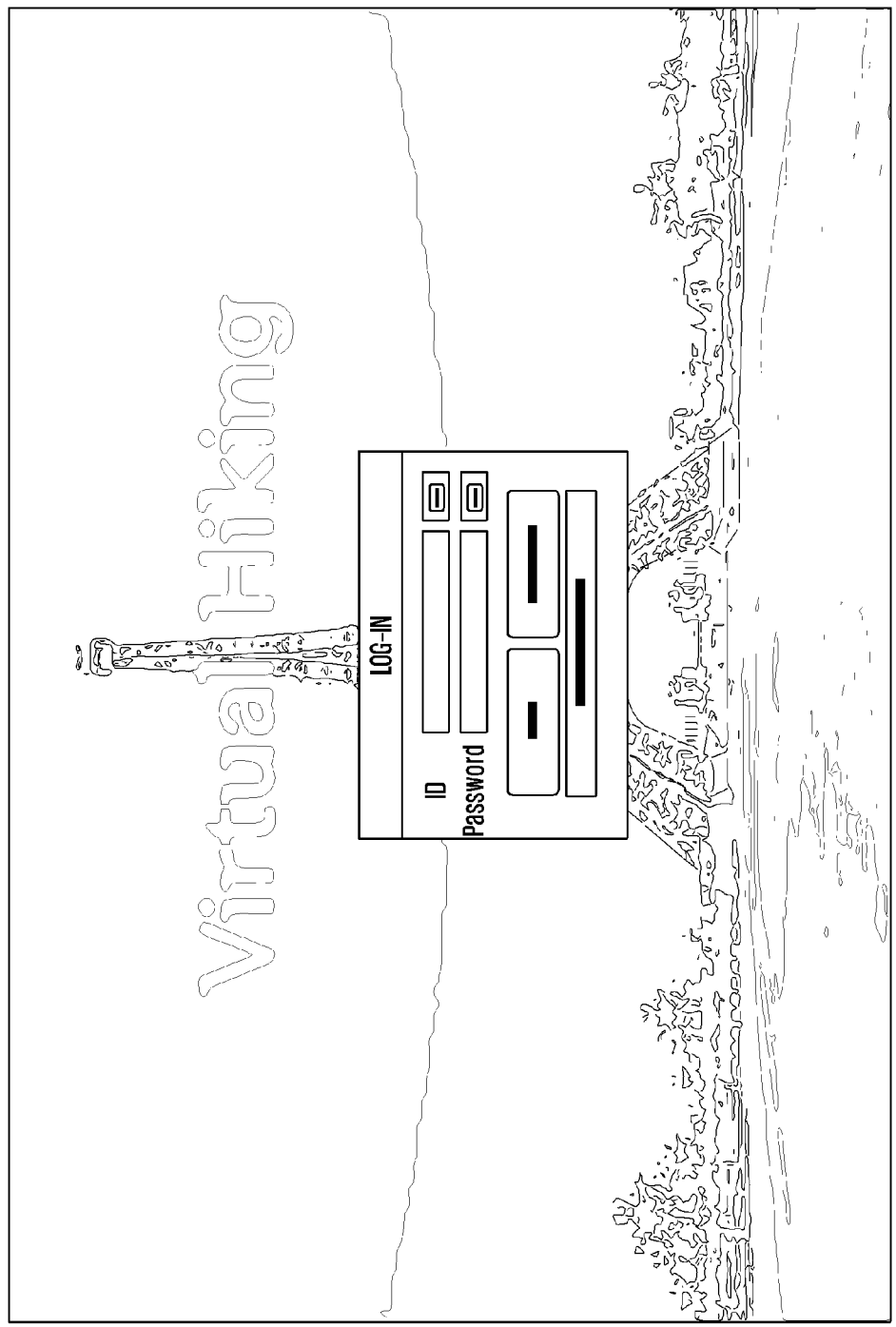
FIGS. 35 to 45 is a simulation view obtained by simulating a virtual hiking screen according to an embodiment of the present invention.

If the user connects to the homepage 520 for the first time, a login screen appears as in FIG. 35, and a button is provided to allow a user without an account to subscribe to the homepage 520 in order to make a new account.

The hiking program may be performed by calling up a simulation program such as Google Earth™ and Google StreetView™ through the storage unit 120 of the PC 100. However, in order to receive a large variety of services, a mode according to a corresponding simulation program may be selected after the user subscribes to the homepage 520 of FIG. 8 and connects to the server 500.

A game may be performed through the homepage 520 of the server 500 and information and an exercise state of the user may be identified. The user information page is configured such that the user may output exercise records (such as a recent exercise time, an exercise distance, speed for sections, and an average speed) performed by the user most recently through a chart or a graph so that the user may easily recognize the exercise records, and correct individual information or change an intensity of exercise.

In step S903, the server 500 controls such that the screen moves to a membership subscription screen displayed through the homepage 520.

In step S905, the user writes user information through the membership screen. For example, the user should register an ID and a password when subscribing to the homepage, and the password may be encrypted to be stored in the subscriber information database 510. Exercise intensity information may be input such that exercises are performed at different intensities according to users' preference.

In step S907, the server 500 determines whether the user information input to the home page 520 is completely written according to a requirement. The server 500 proceeds to step S905 when a requirement is not correct or an item is missing when the user's subscription is submitted, and stores the written user information in the information database 510 when the information is completely written according to the requirement in step S909.

The information database 510 is configured such that the user may conveniently manage individual information and exercise records of the user. The information database 510 may be constructed by using database related programs such as Oracle®, MSSQL, PHP, Apache®, MySQL, and Access. In an embodiment of the present invention, the information database 510 is constructed with MySQL.

The webpage illustrates individual information and exercise information for users by using information stored in the information database 510 so that the user corrects and inputs his or her own information.

Figure 34:
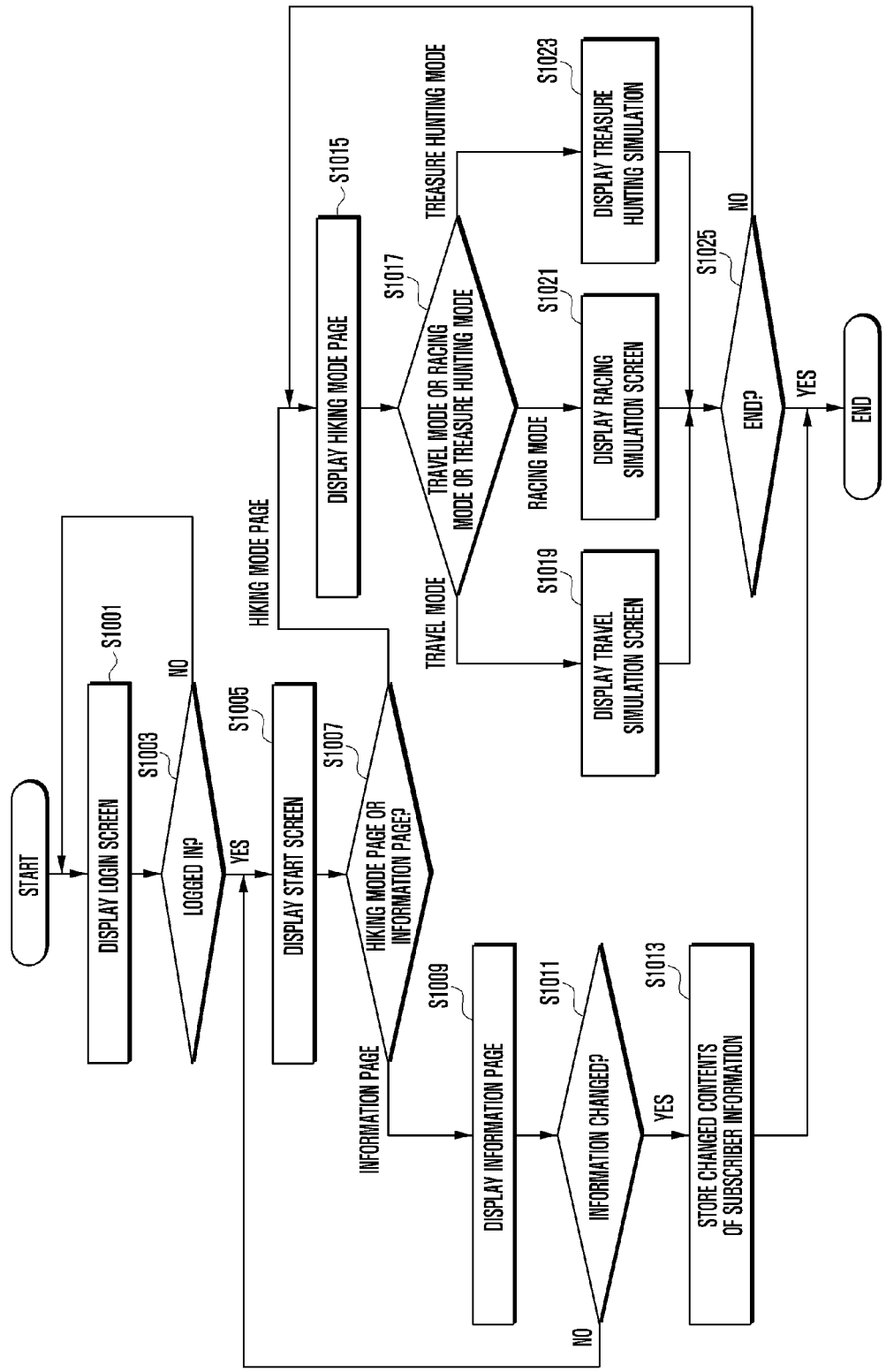
FIG. 34 is a flowchart schematically illustrating an embodiment of subscribing to a virtual hiking homepage and using a home page according to an embodiment of the present invention.

FIG. 34 is a flowchart schematically illustrating an embodiment of subscribing to a virtual hiking homepage and using a home page according to an embodiment of the present invention. Referring to FIG. 34, in step S1001, the server 500 displays a login screen according to a request of the user through the virtual hiking webpage.

In step S1003, the server 500 determines whether the user has logged into the virtual hiking homepage 520. If the user logs in the homepage after the determination of step S1003, the server displays a start page screen in step S1005.

The start page screen may display a hiking mode page through which a hiking simulation may be executed and an information page. In step S1007, the server 500 may display one of the hiking mode page and the information page according to selection of the user.

If the user selects the information page in step S1007, the server controls such that the information page is displayed through the virtual hiking webpage in step S1009 and determines whether the user information is changed through the selection of the user in step S1011.

If the user information is changed in step S1011, the server stores the changed user information in the user information database 510 and completes the operation in step S1013. The webpage allows individual information and exercise information for users through the PC 100 or the HMD 400 by using information stored in the user information database 510 and allows the user to correct his or her information.

If the user selects the hiking mode page in step S1007, the server 500 controls such that the mode page is displayed through the virtual hiking webpage in step S1015, and determines which of a travel mode, a racing mode, and a treasure hunting mode is selected in step S1017.

The contents provided to the mode page of the present invention are produced to be associated with a network based on 3D and Google StreetView™ by using Google Earth API and Google Map API provided by Google®. The contents provided through the hiking mode page may be classified into a game mode and a travel mode.

If the selection of the user is a travel mode through the determination of step S1017, a travel simulation screen according to a travel mode is displayed through the display unit 420 of the PC or HMD 400 in step S1019. The travel mode and the game mode of the present invention may carry out the contents in association with hardware.

The travel simulation screen displayed when a travel mode is selected may offer a feeling of traveling while actually riding a bicycle as the distance of the trip site is determined by using Google StreetView™ through the HMD 400. In addition, since the travel simulation screen provides both domestic and abroad areas that cannot be easily reached by the user, the simulation is more interesting and provides increased exposure. Auditorily, cycle sounds, bird calls, and car sounds may be output through a speaker (not shown) of the PC 100 or an earphone (not shown) provided by the HMD 400 so that the user travels or hikes while listening to the sounds, increasing the sensation of being outdoors.

In the travel mode, it may be displayed that users selected from the users actually connected to the simulation screen through the PC 100 or the HMD 400 travel together while riding bicycles, or it may be displayed that virtual users are selected to travel around together. Alternatively, a single user mode may be realized.

A travel site may be selected when the travel mode is selected. The travel mode is displayed through the display unit 420 of the PC 100 or the HMD 400, and the name of the selected travel site is displayed at one side of the HMD 400.

Figure 40:
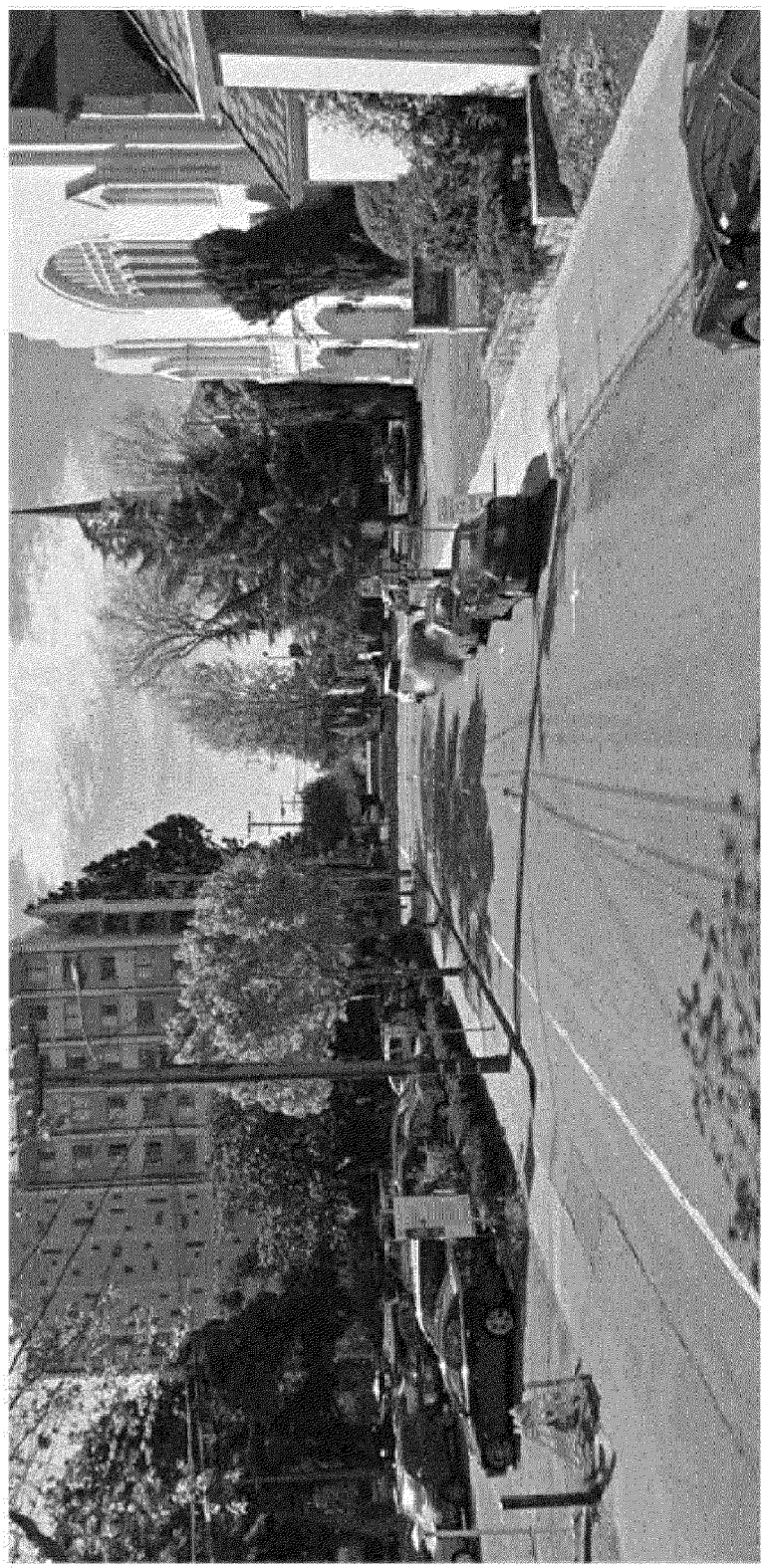
Figure 41:

In the travel mode, a screen of Google StreetView™ is actually moved through the AHRS 410 provided in the HMD 400 according to an angle of view corresponding to a gaze of the user so that a vivid feeling may be further realized. When a branch road of FIG. 41 appears while the user travels down a road in FIG. 40, a rotation value of the handle is received from the potentiometer 360 such that a desired direction may be selected.

The game mode may display a character of another user connected through the server 500. When the user selects to display a racing simulation through the determination of step S1017, the racing simulation screen according to the racing mode is displayed through the display unit 420 of the HMD 400 in step S1021.

Figure 42:
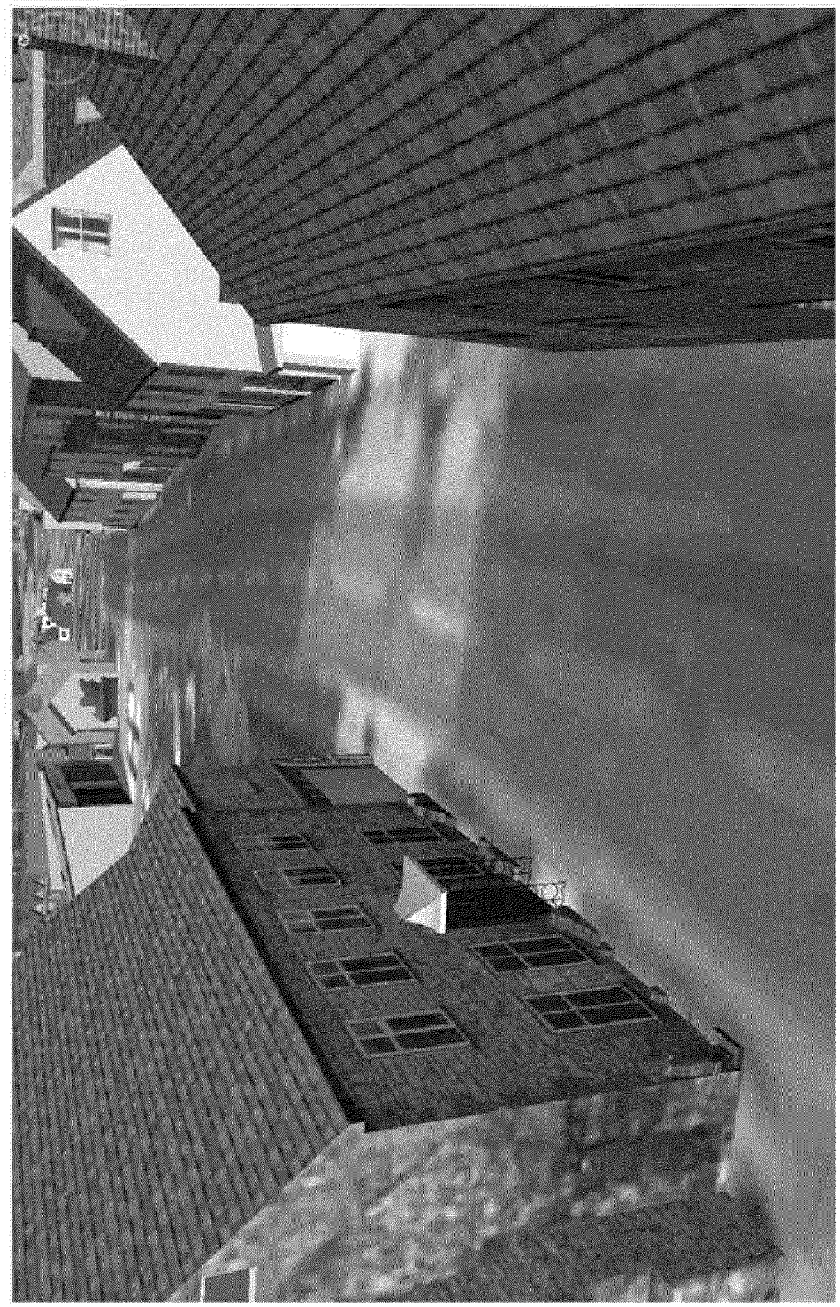

In the racing mode of the game modes, a suitable road or hiking trail is selected from a racing map stored in the information database 510 of the server and the user competes against a virtual character or another user to see who can be the first to reach the finish line. FIG. 42 illustrates an example of a racing mode. Since the racing mode is a game mode for seeing who reaches a destination first, it is performed within a designated path.

Figure 43:
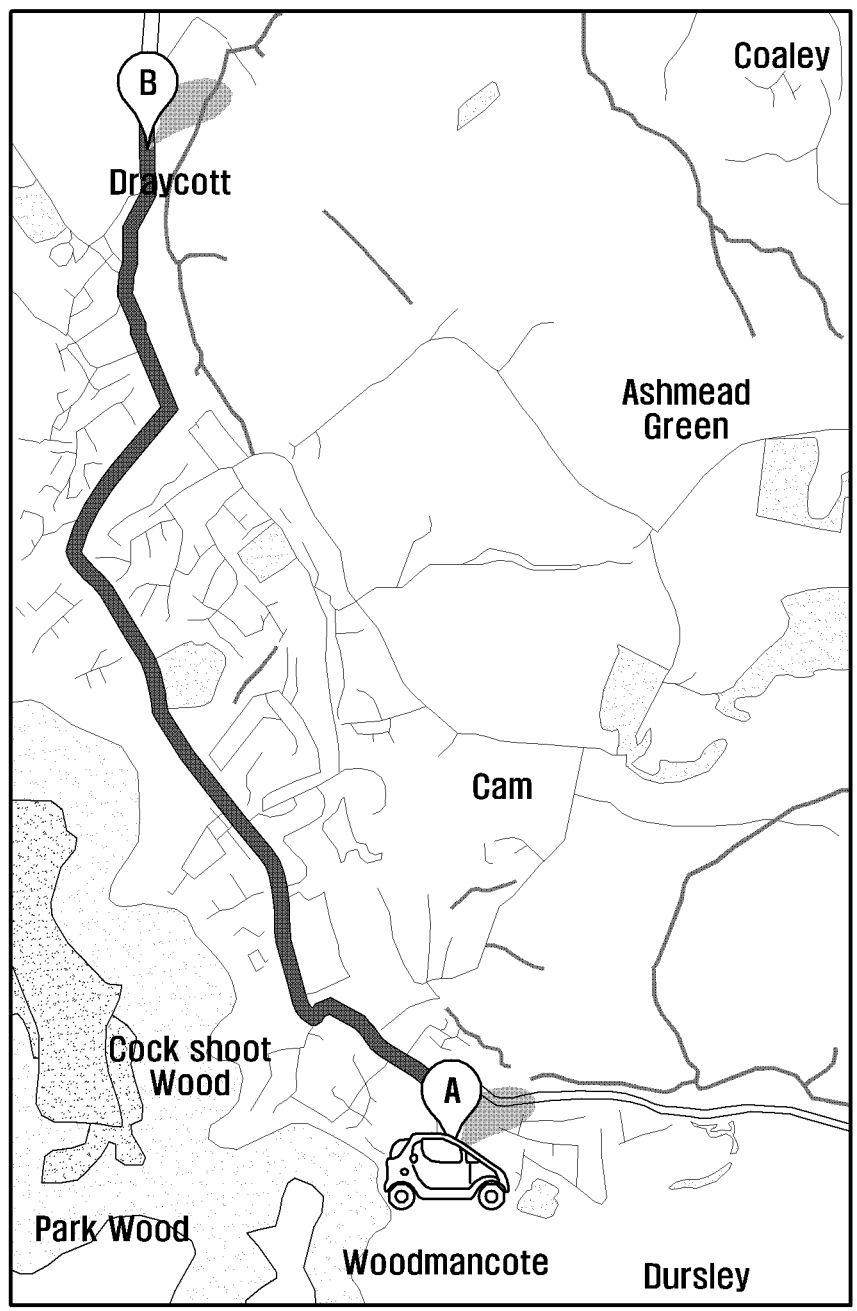

FIG. 43 is a view illustrating a mini map of the racing mode according to an embodiment of the present invention. Referring to FIG. 43, the users may recognize a current location of the user and locations of other users connected to the simulation program at the same time as well as an entire path through the mini map. Racing may be enjoyed within a path designated according to the characteristics of the racing mode. Although the game modes of the present invention include a treasure hunting mode and a racing mode, it is apparent that a plurality of games that may be realized through other virtual realities may be included.

If the user selects a treasure hunting mode in step S1017 from the game modes, the simulation of the treasure hunting is displayed in step S1023, a location of a treasure stored in the mode information database 510 of the homepage 520 may be determined at random, and the user may be informed of the location of the treasure auditorily through a speaker connected to the PC 100 or may be informed of the location of the treasure through an earphone connected to the HMD 400 in response. Alternatively, the location of the treasure may be displayed on one side of the PC 100 or may be displayed on one side of the display unit 420 of the HMD 400.

Figure 44:
Figure 45:
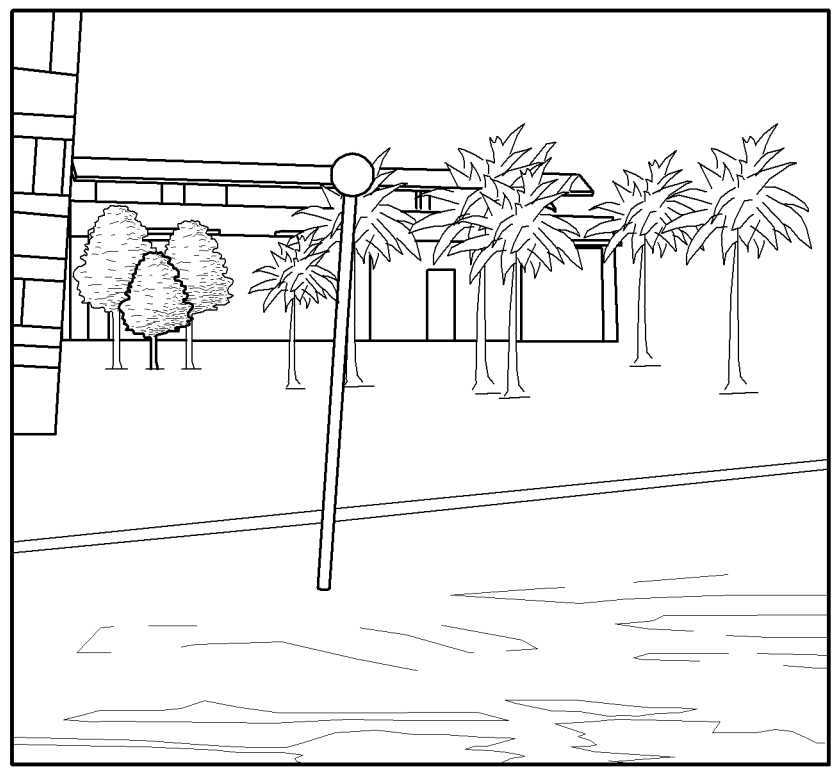

The user should acquire the treasure after figuring out the informed location. When the user finds the treasure, a core is given, and if a limit time is exceeded, the user is informed of the next location of a treasure. If all games have ended, a ranking may be determined after the total score is calculated and compared with those of other users connected to the same game. FIG. 44 illustrates a simulation screen in a state in which a treasure hunting mode is performed, and FIG. 45 illustrates a treasure in the treasure hunting mode both according to an embodiment of the present invention.

As described above, the hiking modes may include a travel mode, a treasure hunting mode, and a racing mode. When the user subscribes to the virtual hiking homepage 520, an ID and a password are registered and the password is encrypted and stored. In order for users to select different intensities of exercise through the virtual hiking homepage 520, an initial intensity of exercise is input and a quantity of exercise is managed by using a database so that the intensity of exercise can be increased or decreased according to the quantity of exercise. In this manner, since the virtual hiking homepage 520 may manage the subscribed members separately, services suitable for the individuals may be provided.

The user may bring his or her exercise records (a recent exercise time, an exercised distance, and a speed) into a database such that the exercise records may be easily recognized and output. An individually licensed user may correct information or change an intensity of exercise according to a grade of the user. For example, a general user may change only his or her information in the database.

By using a serial communication, the PC 100 receives a speed of the bicycle, a distance by which the bicycle proceeds, a rotation angle of the handle, the number of pulses, and an operation of the brake from the bicycle control unit 310 of the bicycle 300 through a channel formed through the serial communication or a wireless communication.

If a field of view of the user is moved while the user carries out the travel mode, the AHRS 410 connected to the HMD 400 transmits pitch angle information and a change in yaw value to the PC 100, and the simulation screen of Google StreetView™ in which the gaze of the user is changed upwards and downwards or to the left and to the right is transmitted to the HMD 400 to be displayed. That is, when the HMD 400 is moved, a value of the sensor mounted to the HMD 400 is received through a hardware communication and an angle is calculated through the data values such that a time point of the screen is moved and a screen viewed by the user is displayed.

Figure 37:
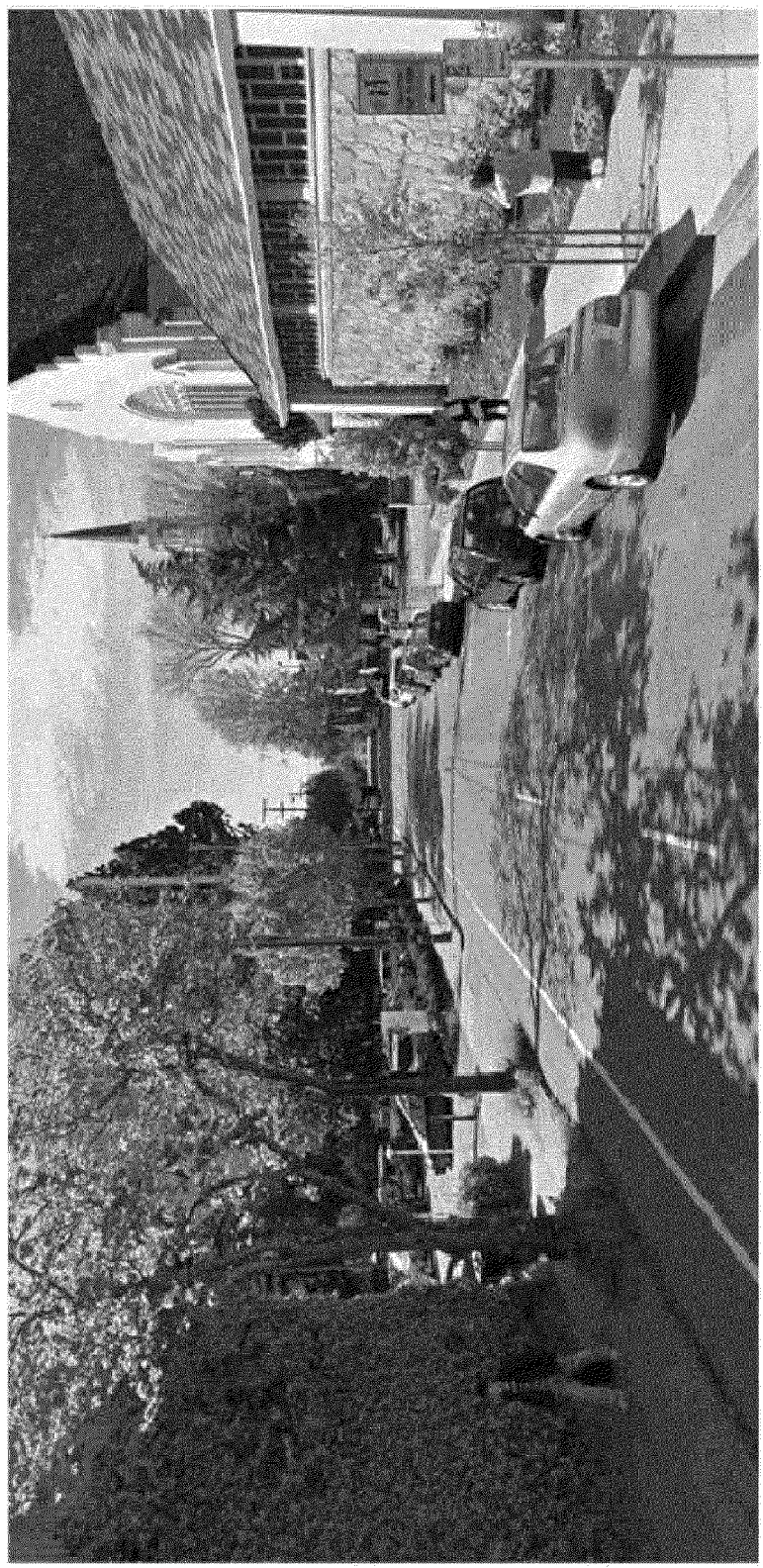
Figure 38:
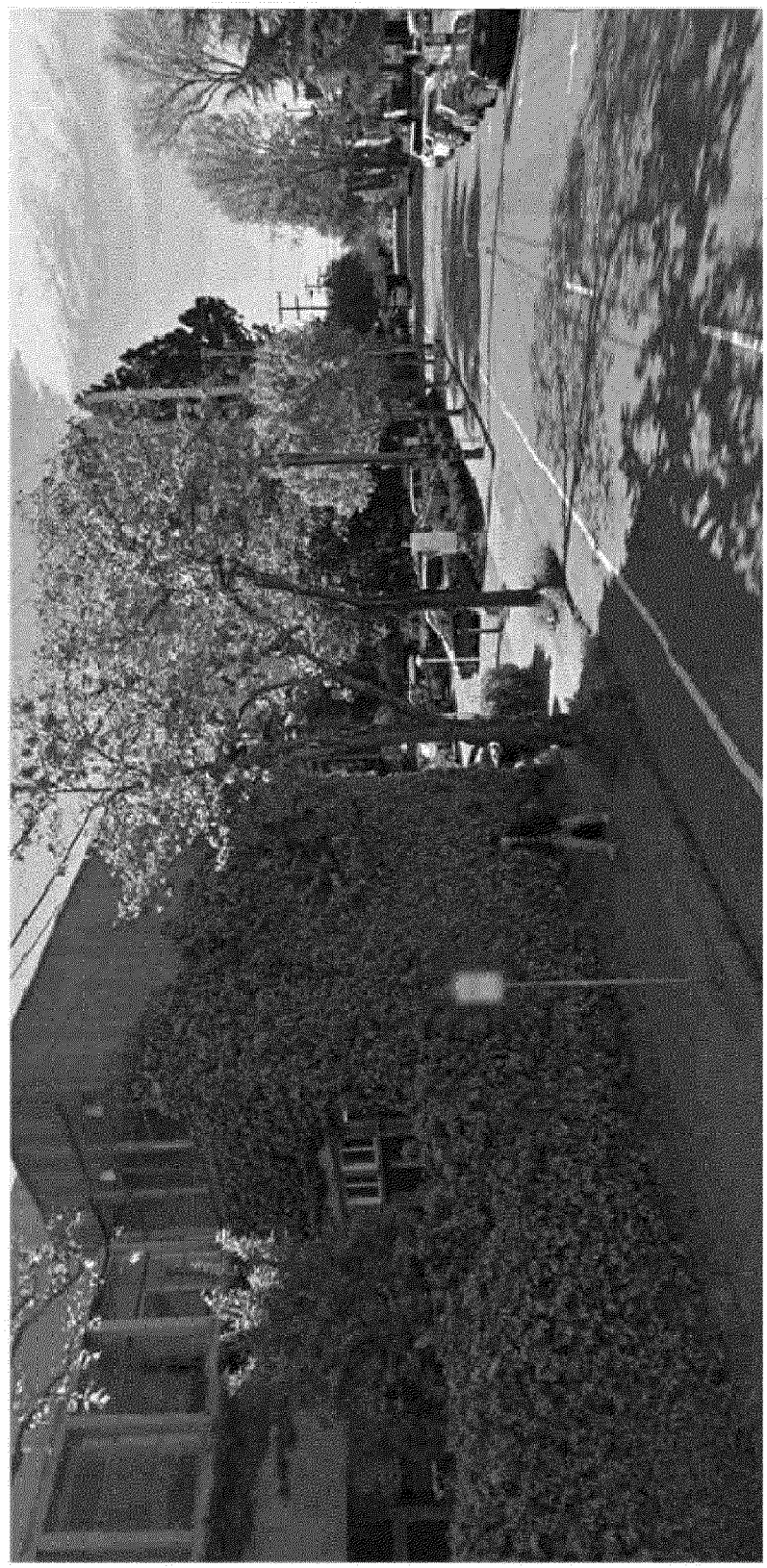
Figure 39:

FIG. 37 illustrates a state in which a front side is viewed according to an embodiment of the present invention. FIG. 38 illustrates a state in which the passenger turns his or her gaze to the left according to an embodiment of the present invention. If the gaze of the user is turned to the left from the state of FIG. 37, the AHRS 410 of the HMD 400 detects that a change occurs in pitch angle, and if the change is transmitted to the PC 100, the PC 100 displays a corresponding screen, that is, the left screen. FIG. 39 illustrates a state in which the passenger turns his or her gaze to the right according to an embodiment of the present invention.

It will be easily appreciated by those skilled in the art that the bicycle 100 of the present invention can be replaced by transportation means such a vehicles or airplanes or exercisers such as treadmills.

Although the virtual hiking system and the virtual hiking method according to the embodiments of the present invention have been described through the specification and the drawings and specific terms are used herein, they are used as general meanings only to help with a description of the technical contents of the present invention and understanding of the present invention, and the present invention is not limited to the embodiments of the present invention. That is, it is apparent to those skilled in the art to which the present invention pertains that various embodiments may be made based on the technical spirit of the present invention.

Although embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A virtual hiking system comprising:
    a PC (Personal Computer) configured to display a simulation screen;
    a motion platform, including at least one universal joint, which connects to a bottom surface of an upper plate support of the motion platform, configured to move corresponding to a state of a road of the simulation screen displayed on the PC; and
    a bicycle fixed onto the motion platform such that the simulation screen is changed corresponding to a movement and a speed of a handle of the bicycle.

2. The virtual hiking system of claim 1, further comprising a server connected to the PC, configured to provide the simulation screen.

3. The virtual hiking system of claim 1, further comprising an HMD (Head Mounted Display) connected to the PC, configured to receive the simulation screen from the PC and display the received simulation screen.

4. The virtual hiking system of claim 1, wherein the simulation screen is Google StreetView™.

5. The virtual hiking system of claim 1, wherein the motion platform comprises:
    a motor unit comprising a plurality of motors configured to generate power, a plurality of cranks identical in number to the plurality of motors, configured to convert the power of the motors to linear motions and transfer the linear motions, and a same plurality of shafts identical in number to the plurality of motors and the plurality of cranks, configured to transfer power from the cranks to the at least one universal joint;
    the upper plate support configured to receive the power from the motor unit to move;
    an encoder unit connected to the motor unit, configured to detect an operation of the motor unit; and
    a motion control unit configured to detect the operation of the motor unit from the encoder unit, recognize an operation of the upper plate support, and control the motor unit such that the upper plate support moves at an angle corresponding to a simulation image transmitted from the PC.

6. The virtual hiking system of claim 3, wherein the PC comprises:
    a storage unit configured to store Google StreetView™, a virtual hiking program, a test program, and a map;
    a control unit configured to selectively connect Google StreetView™ and the virtual hiking program stored in the storage unit to the server and set Google StreetView™ and the virtual hiking program to be linked, and execute the virtual hiking program; and
    a communication unit configured to provide communication channels with the motion platform, the bicycle, the server, and the HMD.

7. The virtual hiking system of claim 6, wherein the communication unit communicates with the motion platform and the bicycle through a serial communication method.

8. The virtual hiking system of claim 3, wherein the HMD comprises an Altitude Heading and Reference System (AHRS) for detecting yaw and pitch values by which the HMD moves and transmitting the detected yaw and pitch values to the PC.

9. The virtual hiking system of claim 1, wherein the bicycle comprises:
    a photo interrupt configured to calculate a movement distance corresponding to a speed of a pedal;

a pulse detecting sensor formed at one side of the handle, configured to detect a pulse of a user contacting the pulse detecting sensor;
a setting unit configured to set a start of the bicycle, d generate a signal for driving the motor unit forwardly and in reverse and stop the motor unit according to a brake and an emergency escape button;
a servo motor configured to adjust an intensity of exercise according to an adjusting lever; and
a potentiometer configured to detect a quantity of rotations of the handle.

* * * * *